US009769703B2

(12) United States Patent
Liu

(10) Patent No.: US 9,769,703 B2
(45) Date of Patent: Sep. 19, 2017

(54) EFFICIENT TRANSMISSION FOR LOW DATA RATE WLAN

(71) Applicant: MARVELL WORLD TRADE LTD., St. Michael (BB)

(72) Inventor: Yong Liu, Santa Clara, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/804,260

(22) Filed: Jul. 20, 2015

(65) Prior Publication Data

US 2015/0327120 A1 Nov. 12, 2015

Related U.S. Application Data

(62) Division of application No. 13/492,538, filed on Jun. 8, 2012, now Pat. No. 9,088,908.

(Continued)

(51) Int. Cl.

*H04W 16/04* (2009.01)
*H04W 28/06* (2009.01)

(Continued)

(52) U.S. Cl.

CPC ......... *H04W 28/065* (2013.01); *H04W 16/14* (2013.01); *H04W 28/18* (2013.01); *H04W 84/12* (2013.01); *Y02B 60/50* (2013.01)

(58) Field of Classification Search

None

See application file for complete search history.

(56) References Cited

U.S. PATENT DOCUMENTS 7,599,332 B2 10/2009 Zelst et al.
7,742,390 B2 6/2010 Mujtaba (Continued)

FOREIGN PATENT DOCUMENTS

CN 101714896 5/2010
EP 1315355 A2 5/2003

(Continued)

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

(Continued)

*Primary Examiner* — Chi H Pham
*Assistant Examiner* — Soon-Dong D Hyun

(57) ABSTRACT

A fragmentation threshold is dynamically determined based on a current transmission rate. A medium access control (MAC) service data unit (MSDU) is received, and it is determined whether a length of the MSDU exceeds the fragmentation threshold. The MSDU is fragmented into multiple MAC protocol data units (MPDUs) when it is determined that the length of the MSDU exceeds the fragmentation threshold, whereas an MPDU that includes the MSDU is generated when it is determined that the length of the MSDU does not exceed the fragmentation threshold.

12 Claims, 23 Drawing Sheets

Related U.S. Application Data

(60) Provisional application No. 61/622,790, filed on Apr. 11, 2012, provisional application No. 61/588,852, filed on Jan. 20, 2012, provisional application No. 61/560,715, filed on Nov. 16, 2011, provisional application No. 61/521,217, filed on Aug. 8, 2011, provisional application No. 61/501,136, filed on Jun. 24, 2011, provisional application No. 61/494,609, filed on Jun. 8, 2011.

(51) Int. Cl.

| | |
|---|---|
| ***H04W 16/14*** | (2009.01) |
| *H04W 84/12* | (2009.01) |
| *H04W 28/18* | (2009.01) |

(56) References Cited

U.S. PATENT DOCUMENTS

| | | | | |
|---|---|---|---|---|
| 8,289,869 | B2 | 10/2012 | Sawai | |
| 8,619,907 | B2 | 12/2013 | Mujtaba et al. | |
| 2003/0133427 | A1 | 7/2003 | Cimini et al. | |
| 2003/0152058 | A1* | 8/2003 | Cimini, Jr. | H04L 47/10 370/338 |
| 2005/0180381 | A1 | 8/2005 | Retzer et al. | |
| 2005/0276241 | A1 | 12/2005 | Kamerman et al. | |
| 2006/0034174 | A1* | 2/2006 | Nishibayashi | H04L 1/1614 370/235 |
| 2006/0165036 | A1 | 7/2006 | Chandra et al. | |
| 2007/0041538 | A1 | 2/2007 | Paden et al. | |
| 2007/0091806 | A1 | 4/2007 | Miyamoto | |
| 2007/0110055 | A1 | 5/2007 | Fischer et al. | |
| 2007/0160021 | A1 | 7/2007 | Xhafa et al. | |
| 2007/0201468 | A1 | 8/2007 | Jokela | |
| 2008/0170553 | A1 | 7/2008 | Montemurro et al. | |
| 2008/0232287 | A1 | 9/2008 | Shao et al. | |
| 2009/0016306 | A1 | 1/2009 | Wang et al. | |
| 2009/0074088 | A1 | 3/2009 | Tao et al. | |
| 2009/0154372 | A1 | 6/2009 | Wang et al. | |
| 2009/0196163 | A1 | 8/2009 | Du | |
| 2010/0091673 | A1 | 4/2010 | Sawai et al. | |
| 2010/0098045 | A1* | 4/2010 | Miyazaki | H04L 1/1825 370/342 |
| 2010/0150118 | A1 | 6/2010 | Daum | |
| 2010/0220679 | A1 | 9/2010 | Abraham et al. | |
| 2010/0271963 | A1* | 10/2010 | Koorapaty | H04L 1/0003 370/252 |
| 2010/0293286 | A1 | 11/2010 | Nikkila et al. | |
| 2010/0329227 | A1 | 12/2010 | Argyriou | |
| 2011/0134821 | A1 | 6/2011 | Kakani | |
| 2011/0314525 | A1 | 12/2011 | Ptasinski et al. | |
| 2012/0063429 | A1* | 3/2012 | Yang | H04L 1/06 370/338 |
| 2012/0106426 | A1 | 5/2012 | Hart et al. | |
| 2012/0147804 | A1 | 6/2012 | Hedayat et al. | |
| 2012/0155343 | A1 | 6/2012 | Wentink | |
| 2012/0263084 | A1 | 10/2012 | Liu et al. | |
| 2012/0314636 | A1 | 12/2012 | Liu | |
| 2012/0314653 | A1 | 12/2012 | Liu | |
| 2012/0314695 | A1 | 12/2012 | Liu | |
| 2012/0314696 | A1 | 12/2012 | Liu | |
| 2013/0044687 | A1 | 2/2013 | Liu et al. | |
| 2013/0064114 | A1* | 3/2013 | Gollakota | H04B 7/0452 370/252 |
| 2013/0148640 | A1 | 6/2013 | Li et al. | |
| 2013/0250973 | A1 | 9/2013 | Agiwal et al. | |
| 2013/0301463 | A1 | 11/2013 | Lee et al. | |

FOREIGN PATENT DOCUMENTS

| | | |
|---|---|---|
| EP | 2144409 | 1/2010 |
| WO | WO-02/17043 A2 | 2/2002 |
| WO | WO-2012/122119 | 9/2012 |

OTHER PUBLICATIONS

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, pp. 1-23 (Nov. 7, 2001).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

De Vegt, "Potential Compromise for 802.11ah Use Case Document", Institute of Electrical and Electronics Engineers, doc. No. IEEE 802.11-11/0457r0, pp. 1-27 (Mar. 2011).

Gunnam et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

Park, "Proposed Specification Framework for TGah", *The Institute of Electrical and Electronics Engineers*, doc. No. IEEE 802.11-11/1137r6, pp. 1-13 (Mar. 2012).

Taghavi et al., "Introductory Submission for TGah", doc. No. IEEE 802.11-11/0062r0, Institute for Electrical and Electronics Engineers, pp. 1-5 (Jan. 14, 2011).

Yu et al., "Coverage extension for IEEE802.11ah," The Institute of Electrical and Electronics Engineers, doc. No. IEEE 802.11-11/0035r1, pp. 1-10 (Jan. 2011).

Office Action in U.S. Appl. No. 13/492,452, dated May 1, 2014 (7 pages).

Notice of Allowance in U.S. Appl. No. 13/492,452, dated Nov. 17, 2014 (11 pages).

Office Action in U.S. Appl. No. 13/492,522, dated Dec. 17, 2013.

(56) References Cited

OTHER PUBLICATIONS

Notice of Allowance in U.S. Appl. No. 13/492,522, dated Jun. 16, 2014 (5 pages).
Office Action in U.S. Appl. No. 13/492,572, dated Oct. 13, 2013 (6 pages).
Office Action in U.S. Appl. No. 13/492,572 dated Apr. 17, 2014 (7 pages).
Notice of Allowance in U.S. Appl. No. 13/492,572 dated Sep. 9, 2014 (5 pages).
Notice of Allowance in U.S. Appl. No. 13/492,572, dated Dec. 26, 2014 (5 pages).
Partial International Search Report in International Application No. PCT/US2012/041629, dated Sep. 24, 2012.
International Search Report and Written Opinion in International Application No. PCT/US2012/041629, dated Jan. 3, 2013.
International Preliminary Report on Patentability in International Application No. PCT/US2012/041629, dated Dec. 10, 2013 (10 pages).
European Search Report in European Patent Application No. EP 16 17 7592, dated Oct. 4, 2016 (2 pages).
Office Action in Chinese Patent Application No. 201280038477.8, dated Nov. 4, 2016, with English translation (18 pages).
Office Action in Chinese Patent Application No. 201280038477.8, dated Jun. 2, 2017, with English translation (6 pages).

* cited by examiner

EFFICIENT TRANSMISSION FOR LOW DATA RATE WLAN

CROSS-REFERENCES TO RELATED APPLICATIONS

This disclosure is a divisional application of U.S. application Ser. No. 13/492,538, entitled "EFFICIENT TRANSMISSION FOR LOW DATA RATE WLAN," filed Jun. 8, 2012 (now U.S. Pat. No. 8,088,908), which claims the benefit of the following U.S. Provisional patent applications:

- U.S. Provisional Patent Application No. 61/494,609, entitled "802.11ah Very Low Rate Support," filed on Jun. 8, 2011;
- U.S. Provisional Patent Application No. 61/501,136, entitled "802.11ah Very Low Rate Support," filed on Jun. 24, 2011;
- U.S. Provisional Patent Application No. 61/521,217, entitled "802.11ah Very Low Rate Support," filed on Aug. 8, 2011;
- U.S. Provisional Patent Application No. 61/560,715, entitled "802.11ah Very Low Rate Support," filed on Nov. 16, 2011;
- U.S. Provisional Patent Application No. 61/588,852, entitled "802.11ah Very Low Rate Support," filed on Jan. 20, 2012; and
- U.S. Provisional Patent Application No. 61/622,790, entitled "Short Beacon Format—H.2.0 Info," filed on Apr. 11, 2012;

The disclosures of all of the above-referenced patent applications are hereby incorporated by reference herein in their entireties.

This disclosure is also related to the following U.S. patent applications, filed on the same day as the parent application:

- U.S. patent application Ser. No. 13/492,452, entitled "EFFICIENT TRANSMISSION FOR LOW DATA RATE WLAN" (now U.S. Pat. No. 8,995,367);
- U.S. patent application Ser. No. 13/492,572, entitled "EFFICIENT TRANSMISSION FOR LOW DATA RATE WLAN" (now U.S. Pat. No. 9,019,914); and
- U.S. patent application Ser. No. 13/492,522, entitled "EFFICIENT TRANSMISSION FOR LOW DATA RATE WLAN" (now U.S. Pat. No. 8,867,467).

The disclosures of all of the above-referenced patent applications are hereby incorporated by reference herein in their entireties.

FIELD OF THE DISCLOSURE

The present disclosure relates generally to communication networks and, more particularly, to data unit formats for long range wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

Work has begun on two new standards, IEEE 802.11ah and IEEE 802.11af, each of which will specify wireless network operation in sub-1 GHz frequencies. Lower frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub 1-GHz range that remain unlicensed, with different specific unlicensed frequencies in different geographical regions. The IEEE 802.11ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands.

SUMMARY

In an embodiment, a method includes generating, at a network interface, a signal field that includes (i) a field to indicate that a physical layer (PHY) data unit is a control frame, one or more of a frame control field, a receiver address (RA) field, and a cyclic redundancy check (CRC) field. The method also includes generating, at the network interface, a PHY data payload (i) that includes one or more of a service field, a transmitter address (TA) field, a network ID field, and a CRC field, and (ii) that omits an RA field. The method additionally includes generating, at the network interface, the PHY data unit to include (i) a preamble, (ii) a PHY header having the SIG field, and (iii) the PHY data payload, and transmitting, with the network interface, the PHY data unit or causing, with the network interface, the PHY data unit to be transmitted.

In other embodiments, the method further includes any combination of one or more of the following elements.

The network ID field of the PHY data payload is a second network ID field, and generating the signal field includes generating the signal field to include a first network ID field.

The first network ID field includes a first portion of a basic service set identifier (BSSID), and the second network ID field includes a second portion of the BSSID.

The first network ID field includes a first portion of a shortened or compressed basic service set identifier (BSSID), and the second network ID field includes a second portion of the shortened or compressed BSSID.

Generating the signal field includes generating the signal field to include a service field, and generating the PHY data payload to omit the service field.

In another embodiment, an apparatus comprises a network interface configured to generate a signal field that includes (i) a field to indicate that a physical layer (PHY) data unit is a control frame, and (ii) one or more of a frame control field, a receiver address (RA) field, and a cyclic redundancy check (CRC) field, and generate a PHY data payload (i) that includes one or more of a service field, a transmitter address (TA) field, a network ID field, and a CRC field and (ii) that omits an RA field. The network interface is also configured to generate the PHY data unit to include (i) a preamble, (ii) a PHY header having the SIG field, and (iii) the PHY data payload, and transmit the PHY data unit or cause the PHY data unit to be transmitted.

In other embodiments, the apparatus further includes any combination of one or more of the following elements.

The network ID field of the PHY data payload is a second network ID field, and the network interface is configured to generate the signal field to include a first network ID field.

The first network ID field includes a first portion of a basic service set identifier (BSSID), and the second network ID field includes a second portion of the BSSID.

The first network ID field includes a first portion of a shortened or compressed basic service set identifier (BSSID), and the second network ID field includes a second portion of the shortened or compressed BSSID.

The network interface is configured to generate the signal field includes generating the signal field to include a service field, and generate the PHY data payload to omit the service field.

In yet another embodiment, a method includes dynamically determining, at a network interface, a fragmentation threshold based on a current transmission rate. The method also includes receiving a medium access control (MAC) service data unit (MSDU), and determining, at the network interface, whether a length of the MSDU exceeds the fragmentation threshold. The method also includes fragmenting, at the network interface, the MSDU into multiple MAC protocol data units (MPDUs) when it is determined that the length of the MSDU exceeds the fragmentation threshold, and generating, at the network interface, an MPDU that includes the MSDU when it is determined that the length of the MSDU does not exceed the fragmentation threshold.

In still another embodiment, an apparatus comprises a network interface configured to dynamically determine a fragmentation threshold based on a current transmission rate, determine whether a length of a medium access control (MAC) service data unit (MSDU) exceeds the fragmentation threshold, fragment the MSDU into multiple MAC protocol data units (MPDUs) when it is determined that the length of the MSDU exceeds the fragmentation threshold, and generate an MPDU that includes the MSDU when it is determined that the length of the MSDU does not exceed the fragmentation threshold.

In yet another embodiment, a method includes receiving a medium access control (MAC) service data unit (MSDU), and determining, at a network interface, whether a length of the MSDU exceeds a fragmentation threshold. Additionally, the method includes fragmenting, at the network interface, the MSDU into multiple MAC protocol data units (MPDUs) when it is determined that the length of the MSDU exceeds the fragmentation threshold, and aggregating, at the network interface, a plurality of the MPDUs corresponding to the MSDU into an aggregate MPDU (A-MPDU).

In still another embodiment, an apparatus comprises a network interface configured to determine whether a length of a medium access control (MAC) service data unit (MSDU) exceeds a fragmentation threshold, fragment the MSDU into multiple MAC protocol data units (MPDUs) when it is determined that the length of the MSDU exceeds the fragmentation threshold, and aggregate a plurality of the MPDUs corresponding to the MSDU into an aggregate MPDU (A-MPDU).

DETAILED DESCRIPTION

Figure 1:
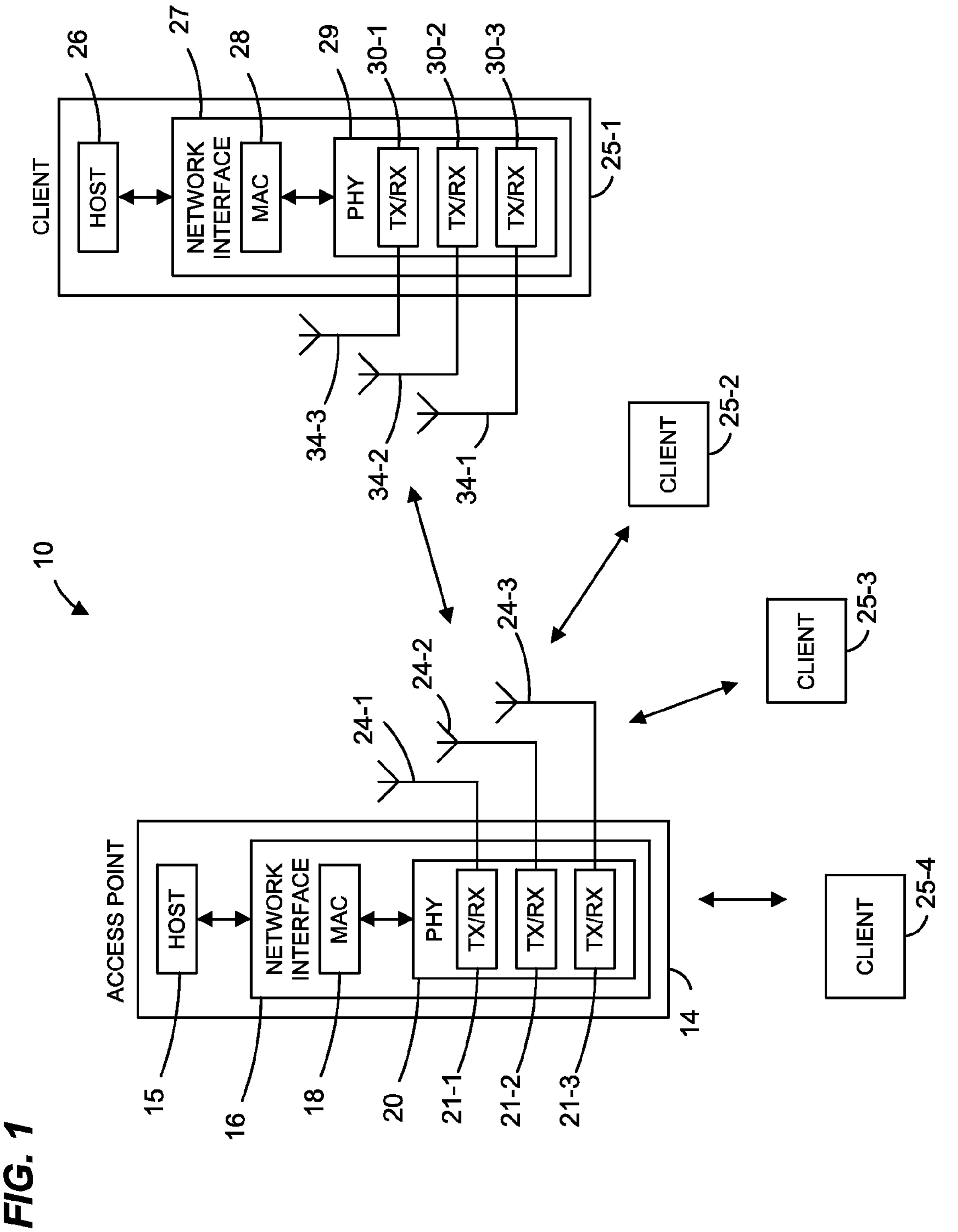
FIG. 1 is a block diagram of an example wireless local area network (WLAN) 10, according to an embodiment.

In embodiments described below, a wireless network device such as an access point (AP) of a wireless local area network (WLAN) transmits data streams to one or more client stations. The AP is configured to operate with client stations according to at least a communication protocol. In an embodiment, the communication protocol defines operation in a sub 1 GHz frequency range, and is typically used for applications requiring long range wireless communication with relatively low data rates (e.g., as compared to the communication protocol defined by the IEEE 802.11n Standard). The communication protocol (e.g., as defined by the IEEE 802.11af Standard or the IEEE 802.11ah Standard, currently in development, in some embodiments) is referred to herein as a "long range" communication protocol.

In an embodiment, the long range communication protocol defines two or more communication modes including at least a regular mode and a very low rate (VLR) mode. The VLR mode has lower data rates than the regular mode and is intended for communication at even longer ranges as compared with the regular mode.

The current IEEE 802.11 Standard defines a maximum physical layer (PHY) protocol data unit (PPDU) duration of approximately 5 milliseconds (ms). At some of the data rates being proposed for the IEEE 802.11af and 802.11ah Standards, the amount of data capable of being transmitted within 5 ms is relatively low, resulting in relatively high overhead and relatively low efficiency. For example, using some of the data rates being proposed for the IEEE 802.11af and 802.11ah Standards and with a maximum PPDU duration of 5 ms, excessive fragmentation of media access control (MAC) data units may occur. Table 1 lists example PPDU payload sizes for the lowest data rate, at various channel bandwidths, being contemplated for the IEEE 802.11af and 802.11ah Standards.

TABLE 1

| Channel Bandwidth (MHz) | Data Rate (Mbps) | Maximum Size of PPDU Payload (bytes) |
|---|---|---|
| 20 | 6 | 3720 |
| 10 | 3 | 1755 |
| 5 | 1.5 | 877.5 |
| 2.5 | 0.75 | 438.75 |
| 1.25 | 0.375 | 219.375 |

As can be seen in Table 1, in some situations, the PPDU may only be capable of carrying at most approximately 200 bytes. When considering that an Ethernet frame can be as long as 1500 bytes, a high number of MAC data units may need to be fragmented in at least some scenarios. Additionally, because each MAC data unit fragment includes MAC header information, the MAC layer efficiency (the percentage of payload data that is being transmitted when taking into account MAC header data) decreases as the data rate decreases.

One potential option is to increase the maximum PPDU duration. Table 2 lists example MAC layer efficiencies for different PPDU durations for a data rate being contemplated for the IEEE 802.11af and 802.11ah Standards.

TABLE 2

| PPDU Duration | Data Rate (Mbps) | MSDU (bytes) | Throughput | MAC Layer Efficiency |
|---|---|---|---|---|
| 5 ms | 0.1875 | 45 | 0.044920783 | 23.96% |
| 10 ms | 0.1875 | 162 | 0.099620384 | 53.13% |
| 15 ms | 0.1875 | 280 | 0.124032942 | 66.15% |
| 20 ms | 0.1875 | 397 | 0.137859144 | 73.52% |

As can be seen in Table 2, increasing the maximum PPDU duration increases MAC layer efficiency. On the other hand, extending the maximum PPDU duration beyond 5 ms leads to longer medium sensing times for channel access (which may increase power consumption because devices may need to spend more time awake), and is problematic because time varying channel conditions can adversely affect reception of the latter end of a very long PPDU.

In some embodiments described below, techniques for reducing fragmentation are utilized. Also, in some embodiments described below, techniques for reducing protocol overhead when fragmentation occurs are utilized. Additionally, in some embodiments described below, techniques are utilized for improving operation when extended length PPDUs are transmitted.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the long range communication protocol.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or more of the client stations 25-2, 25-3 and 25-4, has a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the long range communication protocol and having formats described hereinafter. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the long range communication protocol and having formats described hereinafter, according to various embodiments.

In various embodiments, the PHY processing unit 29 of the client device 25-1 is configured to generate data units conforming to the long range communication protocol and having formats described hereinafter. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the long range communication protocol and having formats described hereinafter, according to various embodiments.

In some embodiments, a network interface (e.g., the network interface 16 of the AP 14 and/or the network interface 27 of the client station 25) is configured to operate in at least two modes including a regular mode and a VLR mode. For example, in an embodiment, the VLR mode utilizes a slower clock rate as compared to the regular mode. In an embodiment, the different clock rates correspond to different data rates. Thus, the VLR mode generally corresponds to slower data rates as compared to the regular mode, at least for some modulation coding schemes (MCSs).

In another embodiment, a PHY data unit generated for the VLR mode is generated using the same clock rate used to generate a regular mode PHY data unit, but using a Fast Fourier Transform (FFT) of a smaller size compared to the FFT size used to generate the data unit for a regular mode. In such embodiments, the smaller FFT size results in PHY data units having less subcarriers in each OFDM symbol, thereby resulting in lower data rate and, accordingly, smaller bandwidths occupied by a PHY data unit generated in VLR mode as compared to PHY data units generated using a larger size FFT for the regular mode. As an example, in one embodiment, the regular mode utilizes FFT of size 64 (or 128, 256, 512, or another suitable size greater than 64), and the VLR mode utilizes FFT size is 32, 16, or another suitable size less than 64.

Alternatively or additionally, in some embodiments, PHY data units for transmission in the VLR mode are modulated using a single carrier, while PHY data units for transmission in regular mode are modulated using orthogonal frequency domain multiplexing (OFDM) modulation. In some such embodiments, the VLR mode (single carrier) PHY data units and the regular mode (OFDM) PHY data units are generated using the same clock rate. In some such embodiments, VLR mode PHY data units typically occupy a smaller bandwidth compared to the lowest bandwidth occupied by regular mode PHY data units. In an embodiment, in the VLR mode, a single carrier PHY data unit is generated according to the data unit format specified by the IEEE 802.11b Standard using a down-clocking ratio of 10 and occupies a bandwidth that is equal to approximately 1.1 MHz. In other embodiments, a different suitable down-clocking ratio is used to generate the VLR mode single carrier PHY data units. For example, the down-clocking ratio for the VLR mode is specified such that a single carrier VLR mode PHY data unit occupies a bandwidth that is equal to a certain desired percentage of the lowest bandwidth occupied by a regular mode OFDM PHY data unit (e.g., ½, ⅔, ¾, etc.). In one embodiment, the single carrier down-clocking factor is chosen such that a single carrier PHY data unit in the VLR mode occupies a bandwidth that is approximately the same as the bandwidth occupied by the data and pilot tones of a lowest bandwidth OFDM PHY data unit transmitted in the regular mode.

A MAC processing unit (such as the MAC processing unit 18 and/or the MAC processing unit 28) generally provides information to a PHY processing unit (such as the PHY processing unit 20 and/or the PHY processing unit 29) for transmission. For example, in an embodiment, the MAC processing unit processes units of information, referred to as MAC service data units (MSDUs) and includes the MSDUs in MAC protocol data units (MPDUs). An MPDU includes information from the MSDU along with MAC header information. MPDUs generated by the MAC processing unit are then provided to the PHY processing unit. The PHY processing unit includes the MPDUs in PHY protocol data units (PPDUs) for wireless transmission. A PPDU includes information from the MPDU along with PHY header information.

Similarly, the PHY processing unit receives PPDUs via the wireless medium, and extracts MPDUs from the received PPDUs. The PHY processing unit provides the extracted MPDUs to the MAC processing unit, which then extracts MSDUs from the extracted MPDUs.

Figure 2:
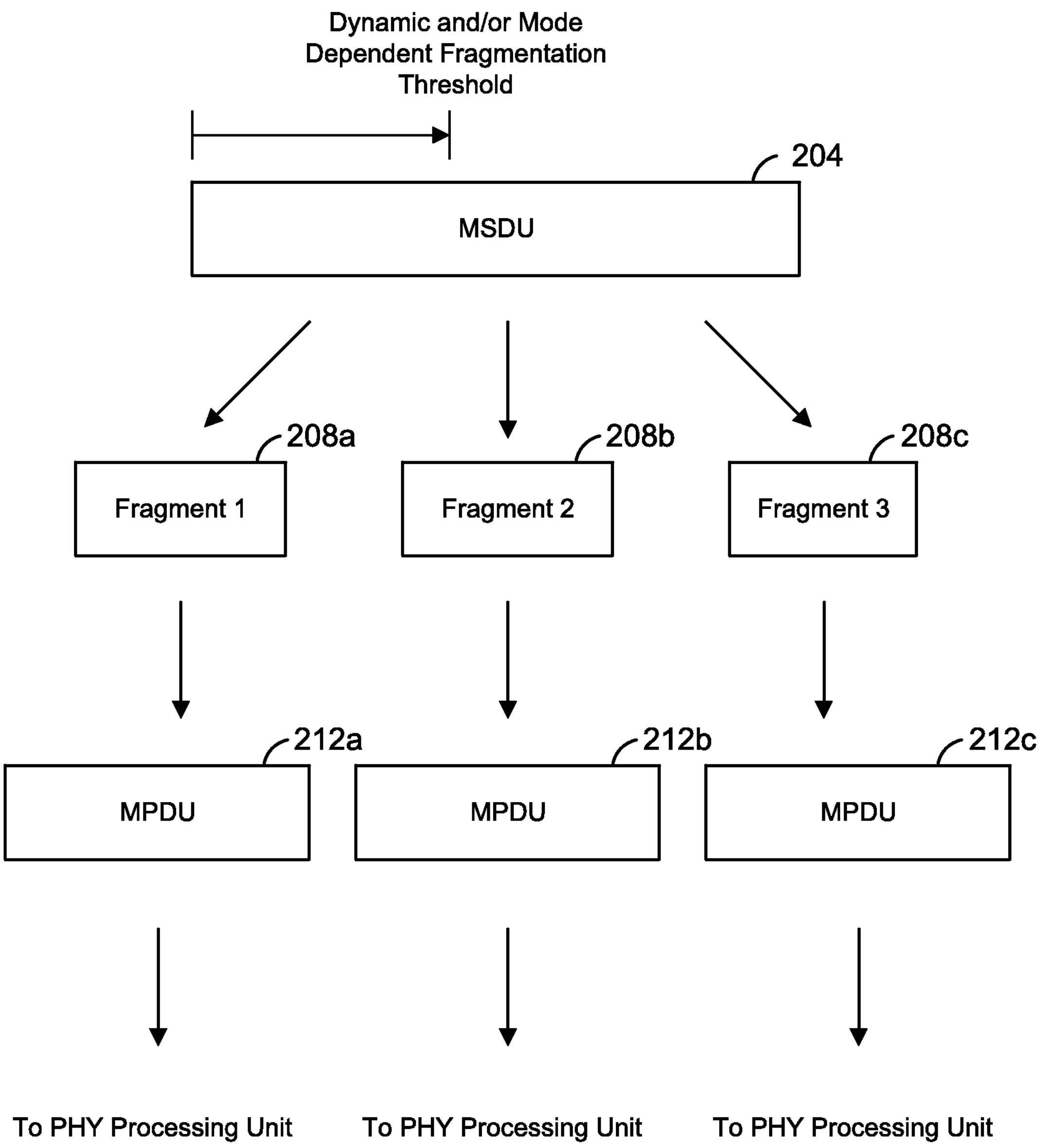
FIG. 2 is a diagram of an example media access control (MAC) layer fragmentation operation, according to an embodiment.

FIG. 2 is a diagram illustrating a fragmentation operation that a MAC processing unit (such as the MAC processing unit 18 and/or the MAC processing unit 28) is configured to perform, according to some embodiments. A length of an MSDU 204 is compared to a fragmentation threshold to determine whether the MSDU 204 should be fragmented. When the length of the MSDU 204 exceeds the fragmentation threshold, the MSDU 204 is fragmented into two or more fragments 208. Next, the fragments 208 are included in respective MPDUs 212, which are provided to the PHY processing unit. Each MPDU is included in a respective PPDU by the PHY processing unit, in an embodiment.

In an embodiment, the fragmentation threshold is dynamically determined based on a current transmission rate. For example, in an embodiment, the fragmentation threshold is dynamically determined based on one or more of a current MCS being utilized, a current number of spatial or space-time streams being utilized, a current channel bandwidth being utilized, etc. In an embodiment, the fragmentation threshold is dynamically determined also based on a retry transmission rate. For example, in an embodiment, the fragmentation threshold is dynamically determined based on a lowest retry transmission rate.

In another embodiment, the fragmentation threshold is determined based on a current mode of operation. For example, when the current mode of operation is the regular mode, a first fragmentation threshold is utilized, whereas when the current mode of operation is the VLR mode, a second fragmentation threshold is utilized, in an embodiment. The first fragmentation threshold is greater than the second fragmentation threshold, in an embodiment.

Figure 3:
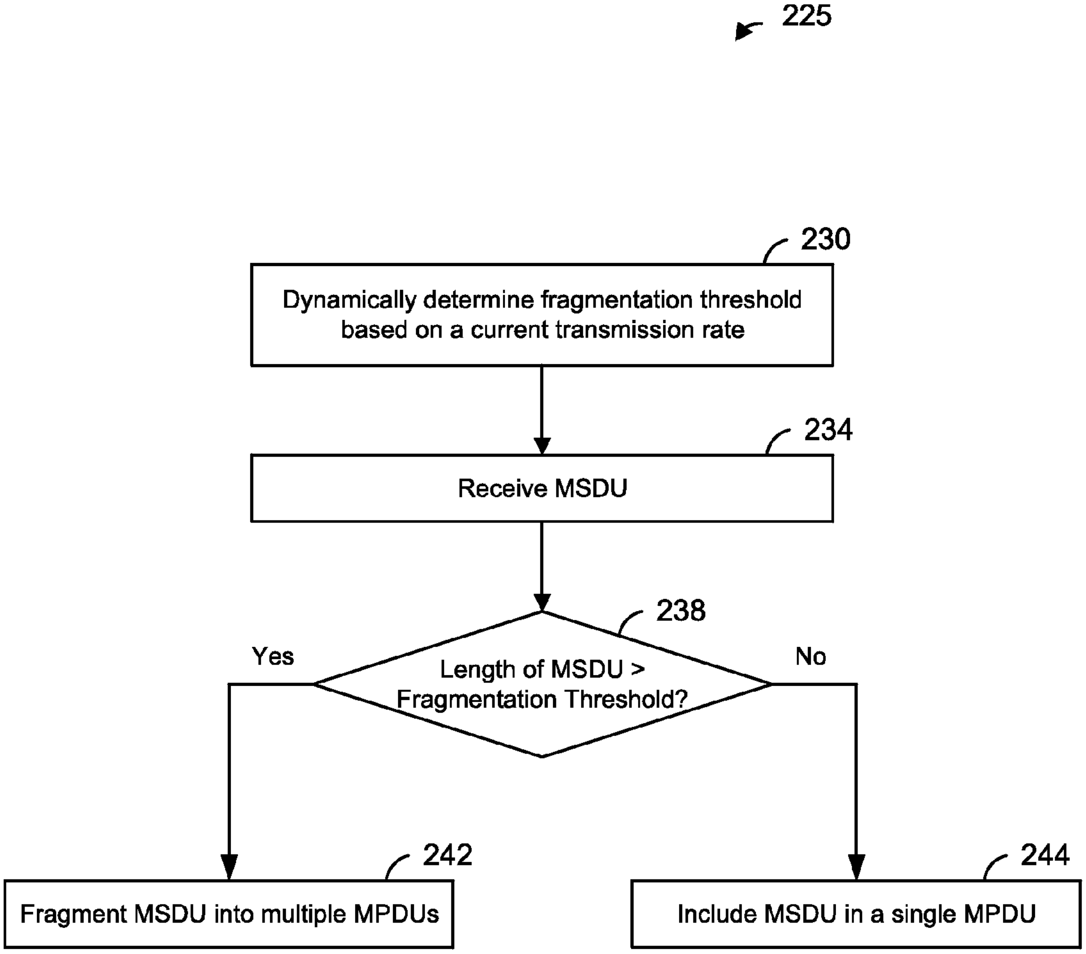
FIG. 3 is a flow diagram of an example method for determining whether a MAC service data unit (MSDU) should be fragmented and fragmenting the MSDU when appropriate, according to another embodiment.

FIG. 3 is a flow diagram of an example method 225 for determining whether an MSDU should be fragmented, according to an embodiment. In an embodiment, the method 225 is implemented by a network interface unit (such as the network interface 16 and/or the network interface 27). For example, the method 225 is implemented by a MAC processing unit (such as the MAC processing unit 18 and/or the MAC processing unit 28), in an embodiment.

At block 230, a fragmentation threshold is dynamically determined based on a current transmission rate. For example, in an embodiment, the fragmentation threshold is dynamically determined based on one or more of a current MCS being utilized, a current number of spatial or space-time streams being utilized, a current channel bandwidth being utilized, etc. In an embodiment, the fragmentation threshold is dynamically determined also based on a retry transmission rate. For example, in an embodiment, the fragmentation threshold is dynamically determined based on a lowest retry transmission rate.

At block 234, an MSDU is received. At block 238, it is determined whether a length of the MSDU exceeds the fragmentation threshold determined at block 230. When it is determined that the length of the MSDU exceeds the fragmentation threshold, the flow proceeds to block 242. At block 242, the MSDU is fragmented into multiple MPDUs.

On the other hand, if it is determined at block 238 that the length of the MSDU does not exceed the fragmentation threshold, the flow proceeds to block 244. At block 244, the MSDU is entirely included in a single MPDU.

MPDUs generated according to the method 225 are provided to the PHY processing unit, which generates a respective PPDU that includes each respective MPDU, in an embodiment.

Referring again to FIG. 2, in an embodiment, different fragmentation thresholds are utilized for the regular mode and the VLR mode. For example, in an embodiment, a first fragmentation threshold is utilized while the network interface is transmitting according to the regular mode, whereas a second fragmentation threshold is utilized while the network interface is transmitting according to the VLR mode. In an embodiment, the first fragmentation threshold is larger than the second fragmentation threshold. In an embodiment, the regular mode of operation includes a plurality of first possible data rates including a first lowest possible data rate, and the fragmentation threshold utilized in the regular mode is based on the first lowest possible data rate. Additionally, in this embodiment, the VLR mode of operation includes a plurality of second possible data rates including a second lowest possible data rate, and the fragmentation threshold utilized in the VLR mode is based on the second lowest possible data rate.

Figure 4:
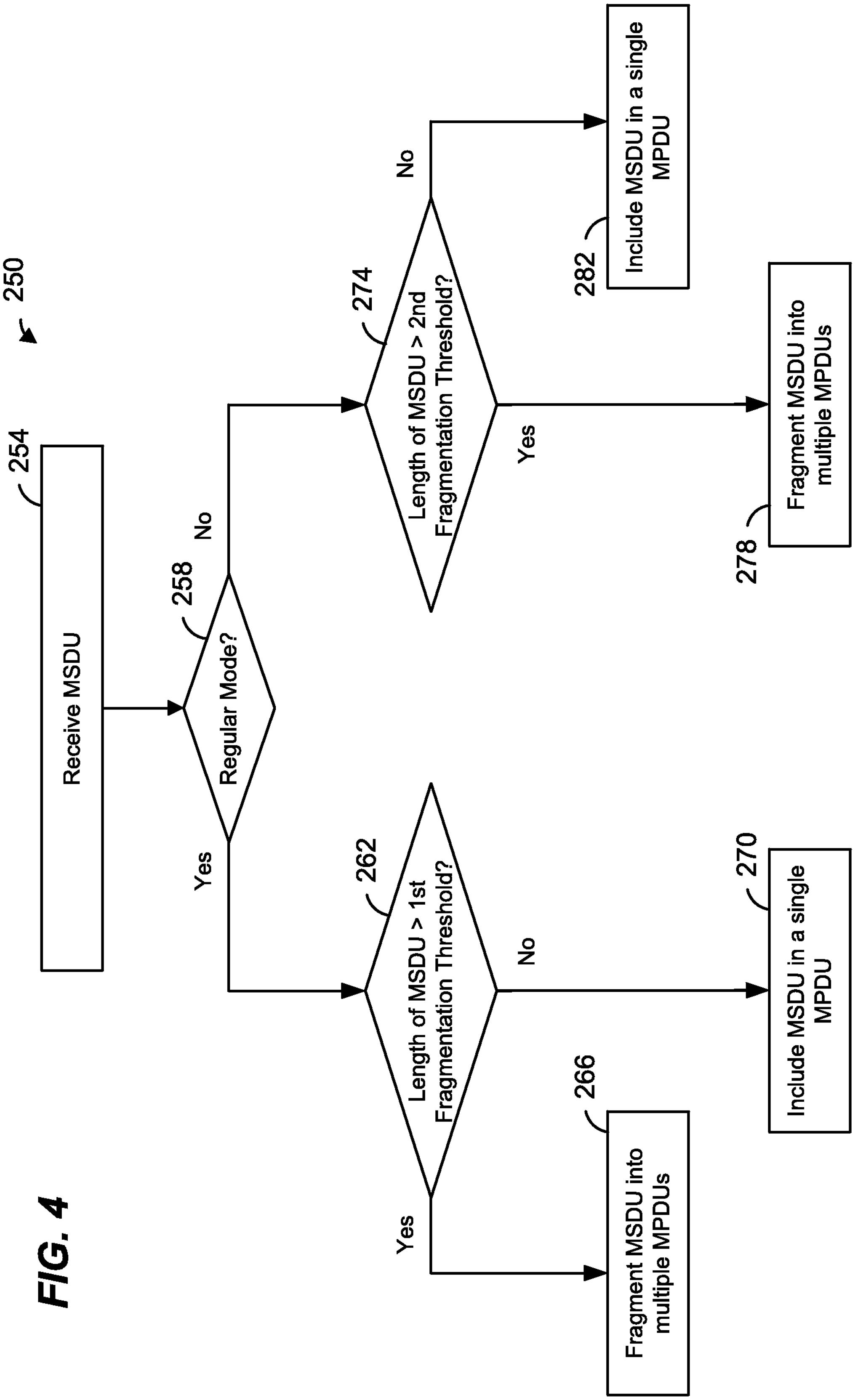
FIG. 4 is a flow diagram of another example method for determining whether an MSDU should be fragmented and fragmenting the MSDU when appropriate, according to another embodiment.

FIG. 4 is a flow diagram of an example method 250 for determining whether an MSDU should be fragmented, according to an embodiment. In an embodiment, the method 250 is implemented by a network interface unit (such as the network interface 16 and/or the network interface 27). For example, the method 250 is implemented by a MAC processing unit (such as the MAC processing unit 18 and/or the MAC processing unit 28), in an embodiment.

At block 254, an MSDU is received. At block 258, it is determined whether the current mode of operation is the regular mode. When it is determined that the current mode of operation is the regular mode, the flow proceeds to block 262.

At block 262, it is determined whether a length of the MSDU exceeds the first fragmentation threshold corresponding to the regular mode as discussed above. When it is determined that the length of the MSDU exceeds the first fragmentation threshold, the flow proceeds to block 266. At block 266, the MSDU is fragmented into multiple MPDUs. On the other hand, if it is determined at block 262 that the length of the MSDU does not exceed the first fragmentation threshold, the flow proceeds to block 270. At block 270, the MSDU is entirely included in a single MPDU.

When it is determined at block 258, however, that the current mode of operation is the VLR mode, the flow proceeds to block 274. At block 274, it is determined whether a length of the MSDU exceeds the second fragmentation threshold corresponding to the VLR mode as discussed above. When it is determined that the length of the MSDU exceeds the second fragmentation threshold, the flow proceeds to block 278. At block 278, the MSDU is fragmented into multiple MPDUs. On the other hand, if it is determined at block 274 that the length of the MSDU does not exceed the second fragmentation threshold, the flow proceeds to block 282. At block 282, the MSDU is entirely included in a single MPDU.

MPDUs generated according to the method 250 are provided to the PHY processing unit, which generates a respective PPDU that includes each respective MPDU, in an embodiment.

Figure 5:
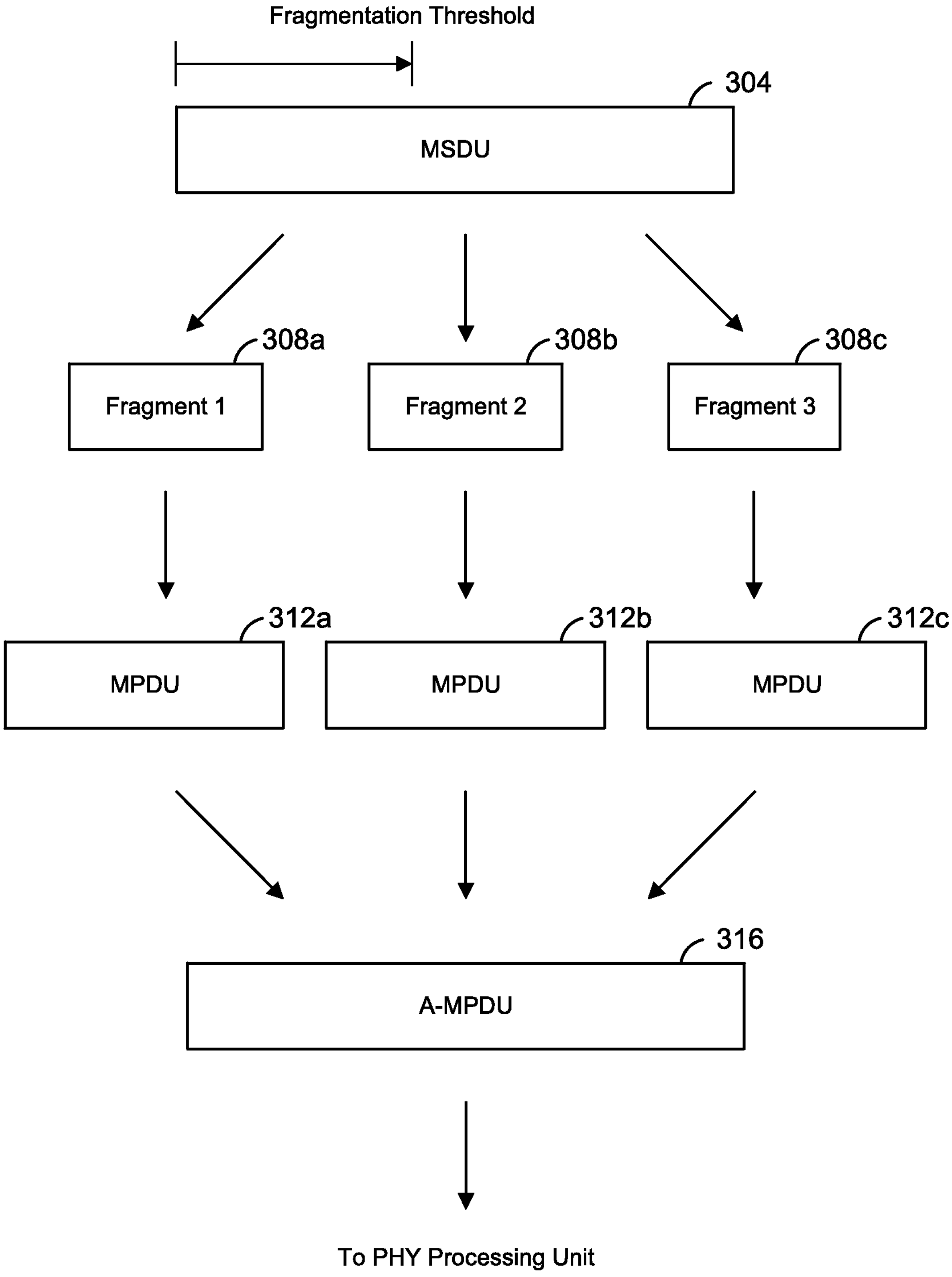
FIG. 5 is a diagram of another example MAC layer fragmentation operation, according to another embodiment.

FIG. 5 is a diagram illustrating a fragmentation operation that a MAC processing unit (such as the MAC processing unit 18 and/or the MAC processing unit 28) is configured to perform, according to some embodiments. The diagram of FIG. 5 is similar to the diagram of FIG. 2, except that, in some scenarios, fragments of an MSDU are aggregated within an aggregate MPDU (A-MPDU) such as or similar to the A-MPDU described in the IEEE 802.11n Standard.

A length of an MSDU 304 is compared to a fragmentation threshold to determine whether the MSDU 204 should be fragmented. In an embodiment, the fragmentation threshold is a dynamic fragmentation threshold such as described above. In another embodiment, the fragmentation threshold is a mode-dependent fragmentation threshold such as described above. In another embodiment, a single fragmentation threshold is utilized in all modes and/or with all data rates.

When the length of the MSDU 304 exceeds the fragmentation threshold, the MSDU 304 is fragmented into two or more fragments 308. Next, the fragments 308 are included in respective MPDUs 312.

In an embodiment, multiple MPDUs 312 are aggregated within an A-MPDU 316, in some scenarios. For example, it is determined whether multiple MPDUs 312 can be aggregated such that a length of the resulting A-MPDU does not exceed a maximum A-MPDU length. In the scenario illustrated in FIG. 5, all three MPDUs are capable of being aggregated without exceeding the maximum A-MPDU length. In other scenarios, less than all of the MPDUs 312 can be aggregated within a single A-MPDU without exceeding the maximum A-MPDU length. The A-MPDU is provided to the PHY processing unit, which generates a PPDU that includes the A-MPDU, in an embodiment. If multiple A-MPDUs 316 are generated, each A-MPDU is provided to the PHY processing unit, which generates a respective PPDU that includes the respective A-MPDU, in an embodiment.

In an embodiment, the maximum A-MPDU length is dynamically determined based on a current transmission rate. For example, in an embodiment, the maximum A-MPDU length is dynamically determined based on one or more of a current MCS being utilized, a current number of spatial or space-time streams being utilized, a current channel bandwidth being utilized, etc. In an embodiment, the maximum A-MPDU length is dynamically determined also based on a retry transmission rate. For example, in an embodiment, the maximum A-MPDU length is dynamically determined based on a lowest retry transmission rate.

In another embodiment, the maximum A-MPDU length is determined based on a current mode of operation. For example, when the current mode of operation is the regular mode, a first maximum A-MPDU length is utilized, whereas when the current mode of operation is the VLR mode, a second maximum A-MPDU length is utilized, in an embodiment. The maximum A-MPDU length is greater than the second maximum A-MPDU length, in an embodiment.

In another embodiment, aggregation of MSDU fragments is utilized in the regular mode, but is not utilized in the VLR mode.

In an embodiment, only MPDUs 312 corresponding to a single MSDU can be aggregated within an A-MPDU 316. Thus, in some scenarios in which all of the MPDUs 312 corresponding to a single MSDU 304 cannot be aggregated within a single A-MPDU 316, some of the MPDUs 312 (e.g., the MPDUs 312*a* and 312*b*) are included within a single A-MPDU 316, whereas one or more other MPDUs 312 (e.g., the MPDU 312*c*) are provided to the PHY processing unit as non-aggregate MPDUs 312. In another embodiment, MPDUs 312 corresponding to different MSDUs can be aggregated within an A-MPDU 316. In other words, an A-MPDU 316, in some scenarios, contains MPDUs 312 corresponding to different MSDUs 304, in an embodiment.

Figure 6:
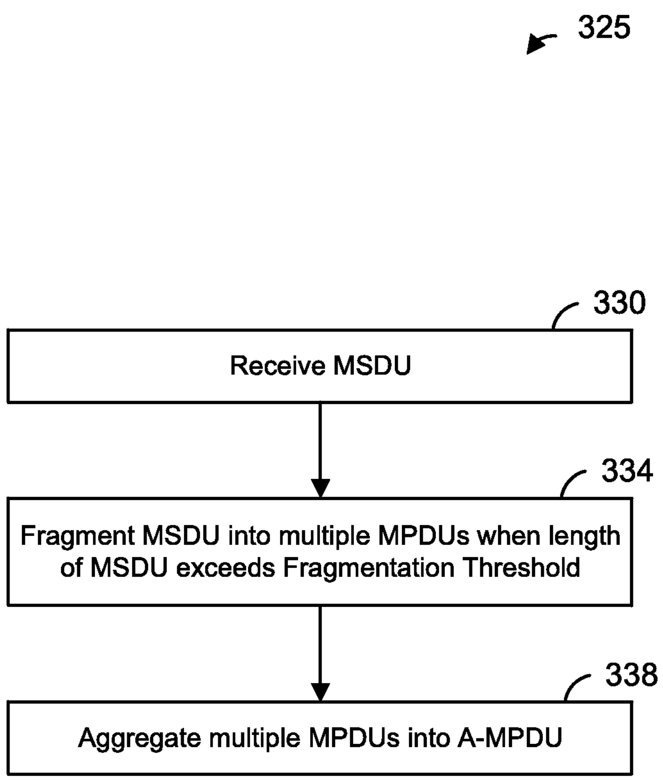
FIG. 6 is a flow diagram of an example method for fragmenting an MSDU, when appropriate, and aggregating multiple MSDU fragments into an aggregate MAC protocol data unit (A-MPDU), when appropriate, according to an embodiment.

FIG. 6 is a flow diagram of an example method 325 for fragmenting an MSDU, when appropriate, and aggregating multiple MSDU fragments into an A-MPDU, when appropriate, according to an embodiment. In an embodiment, the method 325 is implemented by a network interface unit (such as the network interface 16 and/or the network interface 27). For example, the method 325 is implemented by a MAC processing unit (such as the MAC processing unit 18 and/or the MAC processing unit 28), in an embodiment.

At block 330, an MSDU is received. At block 334, the MSDU is fragmented into multiple MPDUs when a length of the MSDU exceeds a fragmentation threshold. At block 338, multiple MPDUs generated at block 334 are aggregated within an A-MPDU when it is determined that the multiple MPDUs 312 can be aggregated such that a length of the resulting A-MPDU does not exceed a maximum A-MPDU length.

A-MPDUs generated according to the method 325 are provided to the PHY processing unit, which generates a respective PPDU that includes each respective A-MPDU, in an embodiment.

In an embodiment, the method 325 is performed in the regular mode of operation but is not performed in the VLR mode of operation. In another embodiment, the method 325 is performed in both the regular mode of operation and the VLR mode of operation.

In embodiments in which fragments of MSDUs are included in one or more A-MPDUs, various suitable acknowledgment mechanisms are utilized. For example, in one embodiment, a receiver generates and transmits an acknowledgment of an A-MPDU when the receiver correctly receives all MPDUs within the A-MPDU. In another embodiment, a receiver generates and transmits a block acknowledgment of an A-MPDU, where the block acknowledgment includes (i) a sequence number (SN) corresponding to the MSDU from which the fragments were generated, and (ii) a bitmap to indicate which of the fragments were received correctly. In another embodiment, a receiver generates and transmits a block acknowledgment of one or more A-MPDUs and/or MPDUs, where the block acknowledgment includes (i) an SN corresponding to an initial MSDU to which the block acknowledgment corresponds, and (ii) an SN bitmap to indicate which entire MSDUs were received correctly.

Figure 7A:
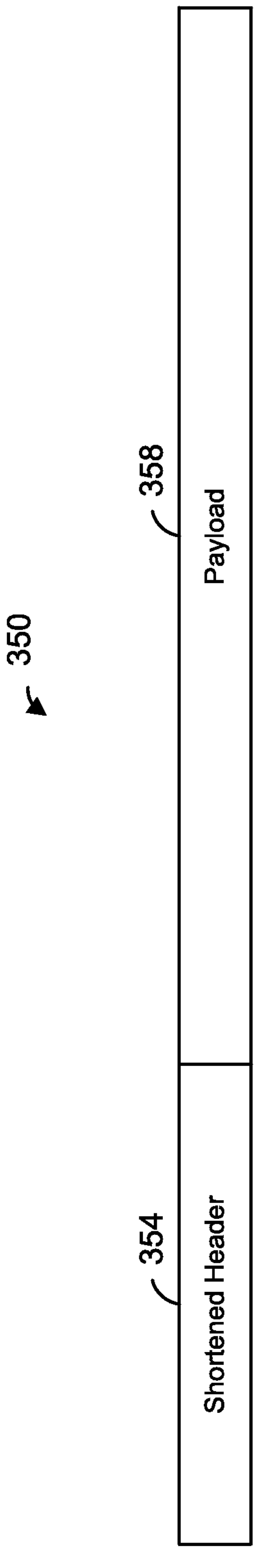
FIG. 7A is a diagram of an example MSDU fragment included in an A-MPDU and that may be utilized for at least some MSDU fragments in an A-MPDU, in an embodiment.

In some embodiments, a full MPDU MAC header is included in the first MSDU fragment included in an A-MPDU, whereas other fragments in the A-MPDU have a simplified and/or shortened MAC header to help reduce the overall length of the A-MPDU. FIG. 7A is a diagram of an example MSDU fragment 350 included in an A-MPDU and that may be utilized for at least some MSDU fragments in an A-MPDU, in some embodiments. The fragment 350 includes a MAC header portion 354 and a payload 358. In an embodiment, the MAC header portion 354 is shorter than and/or omits fields the MAC header specified in the current IEEE 802.11 Standard. For example, in an embodiment, the MAC header portion 354 includes a fragment number (FN) field and a bit that indicates whether subsequent MSDU fragments follow, but omits one or more of an SN field, a receiving station address (RA) field and a transmitting station address (TA) field.

Figure 7B:
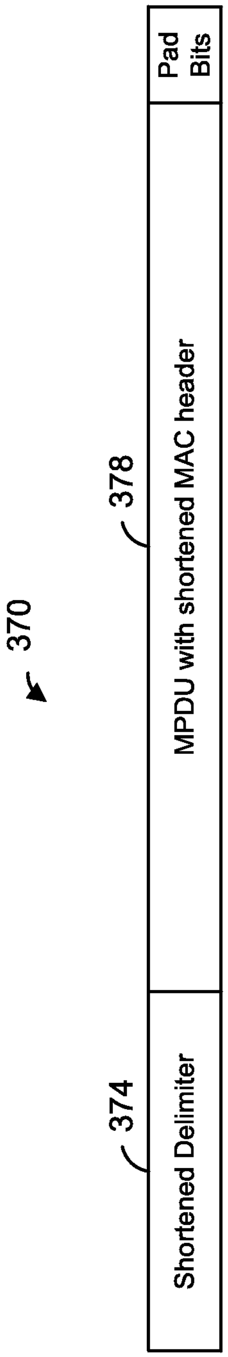
FIG. 7B is a diagram of an example A-MPDU subframe, which includes an MSDU fragment, according to an embodiment.

In some embodiments, MSDU fragments included in an A-MPDU have a simplified and/or shortened MPDU delimiter (as compared to the MPDU delimiter specified by the IEEE 802.11n Standard) to help reduce the overall length of the A-MPDU. FIG. 7B is a diagram of an example A-MPDU subframe 370 (which includes an MSDU fragment) that may be utilized in some embodiments. The subframe 370 includes a delimiter portion 374 and an MPDU 378 (that includes an MSDU fragment). In some embodiments, the delimiter portion 374 is shorter than and/or omits fields of the A-MPDU delimiter field specified in the IEEE 802.11n Standard. For example, in an embodiment, the delimiter field 374 has a length of two bytes. In another embodiment, the delimiter field 374 has a length of three bytes. In some embodiments, the MPDU 378 has a MAC header that is shorter than and/or omits fields of the MAC header field specified in the current IEEE 802.11 Standard. For example, in an embodiment, the SN field of the MPDU has a length of 6 bits. As another example, in an embodiment, the FN field of the MPDU has a length of 2 bits.

In some embodiments, techniques described with respect to FIG. 7A are combined with techniques described with respect to FIG. 7B in order to reduce the overall length of the A-MPDU.

Figure 8:
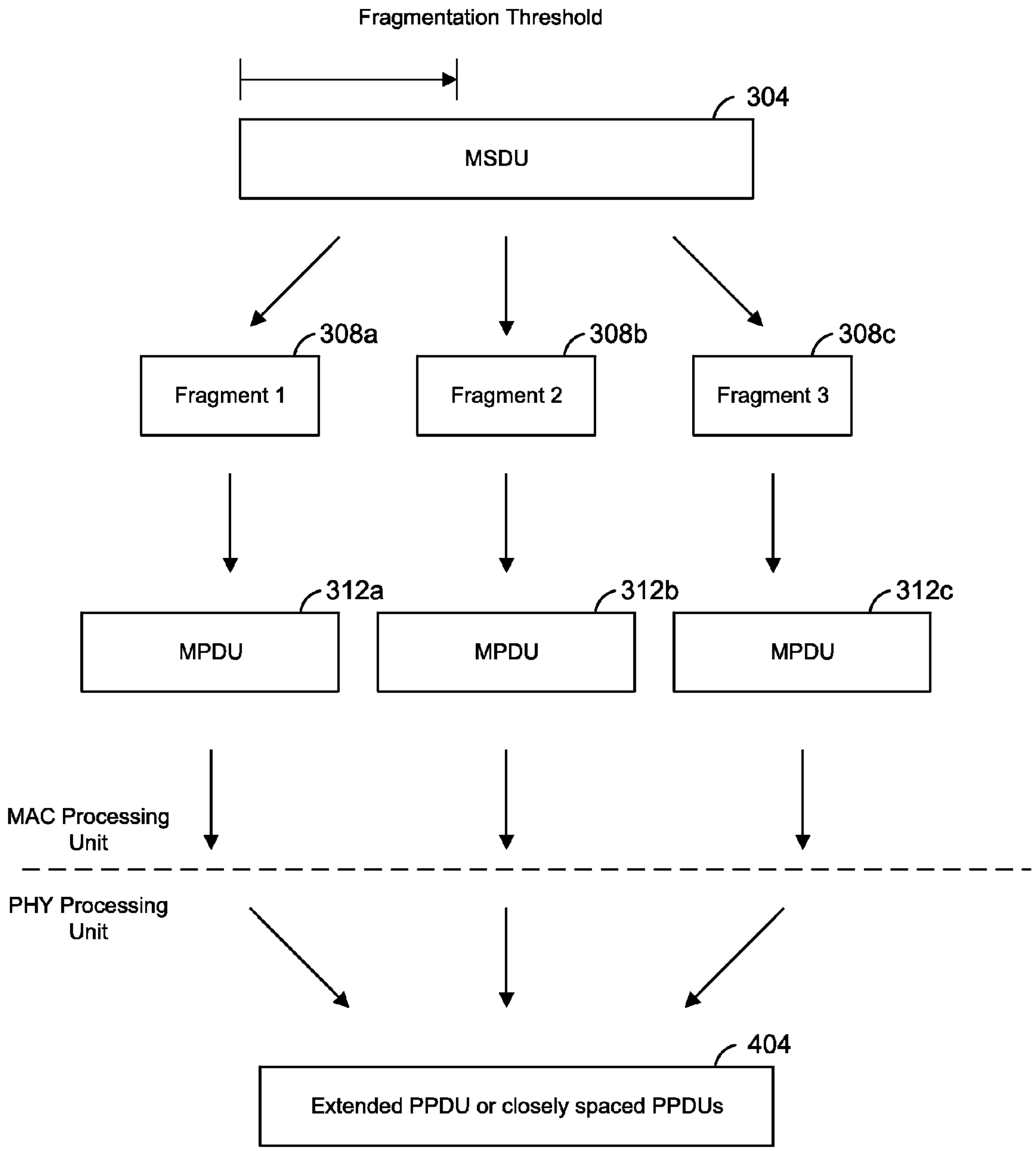
FIG. 8 is a diagram of an example fragmentation/aggregation operation, according to an embodiment.

FIG. 8 is a diagram illustrating a fragmentation operation that a MAC processing unit (such as the MAC processing unit 18 and/or the MAC processing unit 28) is configured to perform, as well as an aggregation process that a PHY processing unit (such as the PHY processing unit 20 and/or the PHY processing unit 2) is configured to perform, according to some embodiments. The diagram of FIG. 8 is similar to the diagram of FIG. 5, except that, in some scenarios, fragments of an MSDU are aggregated within an extended PPDU Liked numbered elements from FIG. 5 are not discussed in detail for brevity.

The MPDUs 312, which correspond to the fragments of the MSDU 304, are provided to the PHY processing unit. In an embodiment, multiple MPDUs 312 are aggregated, by the PHY processing unit, within an extended PPDU 404, in some scenarios. For example, it is determined whether multiple MPDUs 312 can be aggregated such that a length of the resulting extended PPDU does not exceed a maximum extended PPDU length. In the scenario illustrated in FIG. 8, all three MPDUs are capable of being aggregated without exceeding the maximum extended PPDU length. In other scenarios, less than all of the MPDUs 312 can be aggregated within a single extended PPDU without exceeding the maximum extended PPDU length.

In an embodiment, the maximum extended PPDU length is dynamically determined based on a current transmission rate. For example, in an embodiment, the maximum extended PPDU length is dynamically determined based on one or more of a current MCS being utilized, a current number of spatial or space-time streams being utilized, a current channel bandwidth being utilized, etc. In an embodiment, the maximum extended PPDU length is dynamically determined also based on a retry transmission rate. For example, in an embodiment, the maximum extended PPDU length is dynamically determined based on a lowest retry transmission rate.

In another embodiment, the maximum extended PPDU length is determined based on a current mode of operation. For example, when the current mode of operation is the regular mode, a first maximum extended PPDU length is utilized, whereas when the current mode of operation is the VLR mode, a second maximum extended PPDU length is utilized, in an embodiment. The maximum extended PPDU length is greater than the second maximum extended PPDU length, in an embodiment.

In other embodiments, it is determined whether multiple MPDUs 312 can be aggregated such that a length of the resulting extended PPDU fits within a transmit opportunity (TXOP) period.

In another embodiment, aggregation of MSDU fragments into an extended PPDU is utilized in the regular mode, but is not utilized in the VLR mode.

In an embodiment, only MPDUs 312 corresponding to a single MSDU can be aggregated within an extended PPDU 404. Thus, in some scenarios in which all of the MPDUs 312 corresponding to a single MSDU 304 cannot be aggregated within a single extended PPDU 404, some of the MPDUs 312 (e.g., the MPDUs 312*a* and 312*b*) are included within a single extended PPDU 404, whereas one or more other MPDUs 312 (e.g., the MPDU 312*c*) are transmitted as regular PPDUs (e.g., non-extended PPDUs). In another embodiment, MPDUs 312 corresponding to different MSDUs can be aggregated within an extended PPDU 404. In other words, an extended PPDU 404, in some scenarios, contains MPDUs 312 corresponding to different MSDUs 304, in an embodiment.

Figure 9A:
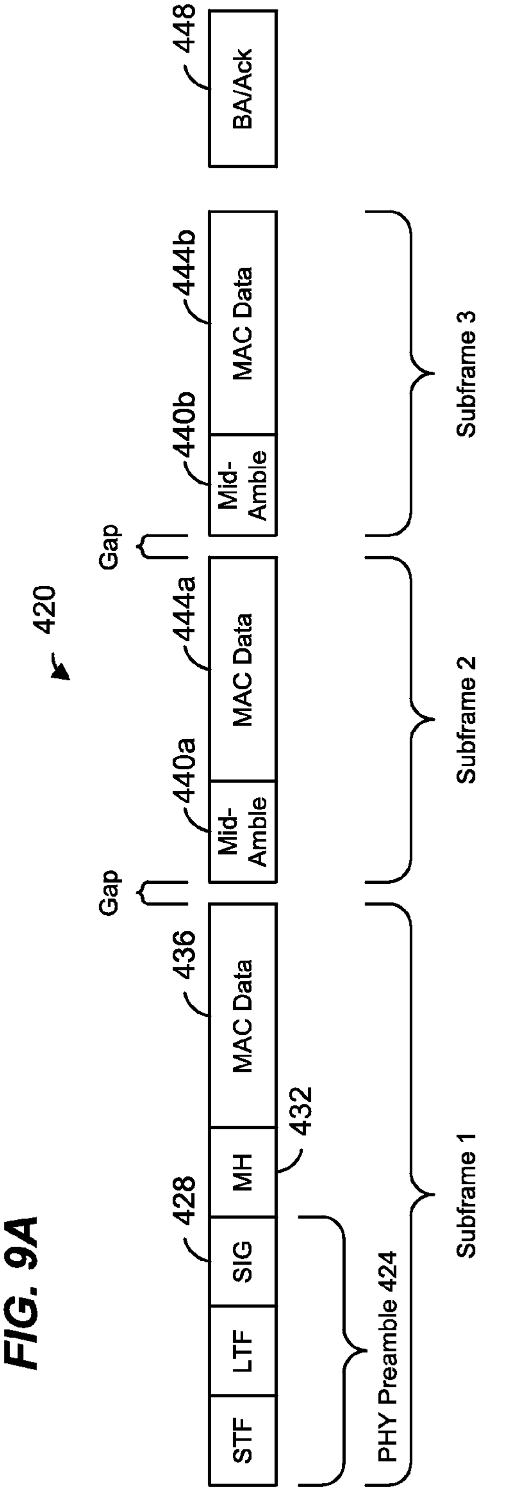
FIG. 9A is a diagram of an example extended physical layer (PHY) protocol data unit (PPDU), according to an embodiment.

FIG. 9A is a diagram of an example extended PPDU 420, according to an embodiment. The extended PPDU 420 includes a plurality of subframes (e.g., subframe 1, subframe 2 and subframe 3 in the illustrative example of FIG. 9A). The first subframe of the extended PPDU 420 includes a PHY preamble 424 with a signal field 428. The signal field 428 includes an indication of the duration of the extended PPDU 420, in an embodiment. The first subframe includes a MAC header (MH) portion 432 and a MAC data portion 436. Each of the following one or more subframes includes a mid-amble 440 and a MAC data portion 444, and omits a MH portion, in an embodiment. The mid-amble 440 is a duplicate of the PHY preamble 424 in an embodiment. The mid-amble 440 includes only a portion of the PHY preamble 424 in an embodiment (e.g., the mid-amble 440 omits certain suitable fields of the PHY preamble 424). The mid-amble 440 is a shorter version of the PHY preamble 424 in an embodiment (e.g., certain suitable fields in the mid-amble 440 are suitably shortened in length as compared to the corresponding fields of the PHY preamble 424).

The mid-ambles 440 are configured to improve reception of extended PPDUs at least by providing training data to permit receiving stations to update a channel estimate during reception of the extended PPDU 420. Additionally, each mid-amble 440 includes a signal field that includes duration information indicating a remaining duration of the extended PPDU 420, in an embodiment. Such duration information will assist receiving stations is determining when the extended PPDU 420 will end for purposes of power saving modes, etc.

In an embodiment, a suitable gap is included between adjacent subframes of the extended PPDU 420. In an embodiment, the gap is at least a short interframe space (SIFS) as defined by the IEEE 802.11 Standard, a RIFS, or another suitable spacing.

In various embodiments, the receiving station acknowledges the extended PPDU 420 with an acknowledgment or a block acknowledgment 448. For example, in one embodiment, the receiving station acknowledges the extended PPDU 420 with an acknowledgment 408 only when all of the subframes of the extended PPDU 420 are received correctly. In another embodiment, the receiving station acknowledges the extended PPDU 420 with a block acknowledgment 408 that indicates (e.g., with a bitmap) which of the subframes of the extended PPDU 420 were received correctly.

Figure 9B:
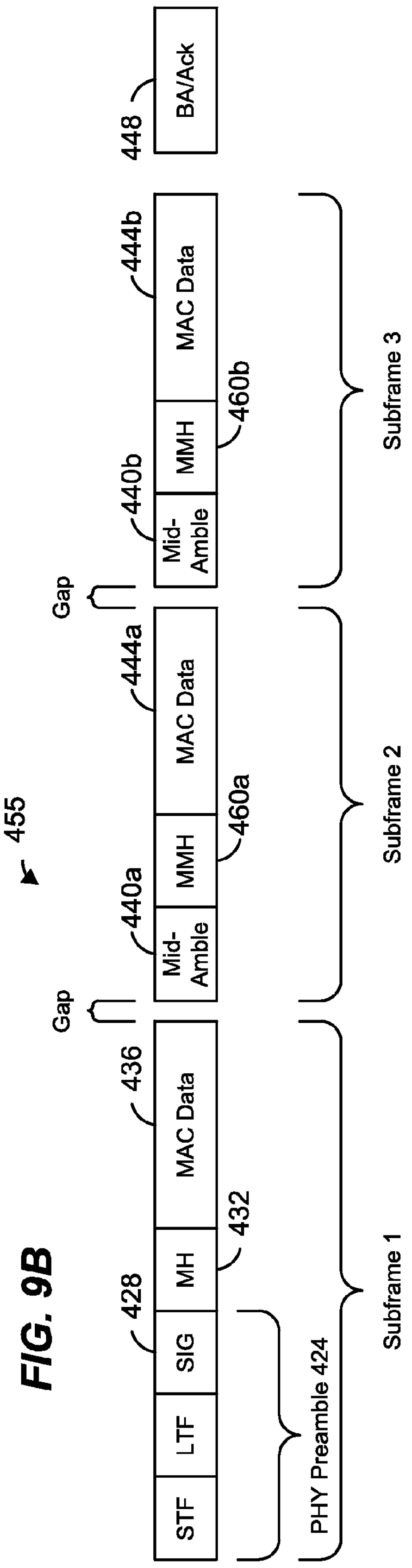
FIG. 9B is a diagram of another example extended PPDU, according to another embodiment.

FIG. 9B is a diagram of another example extended PPDU 455, according to another embodiment. The extended PPDU 455 is similar to the extended PPDU 420 of FIG. 9A, except that each of the subframes that follows the first subframe includes a mid-MAC header (MMH) portion 460.

The MMH portion 460 includes only a portion of the MH portion 432 in an embodiment (e.g., the MMH portion 460 omits certain suitable fields of the MH portion 432, such as one or more of an RA field, a TA field, a frame control field, etc.). In an embodiment, the MMH portion 460 includes one or more of a SN field, an FN field, a security header, a length field, etc.

The MMH portion 460 is a shorter version of the MH portion 432 in an embodiment (e.g., certain suitable fields in the MMH portion 460 are suitably shortened in length as compared to the corresponding fields of the MH portion 432). For example, in an embodiment, an SN field of the MMH portion 460 has a length of 6 bits. As another example, in an embodiment, an FN field of the MMH portion 460 has a length of 2 bits.

In another embodiment, each MMH portion 460 is a duplicate of the MH portion 432.

Referring now to FIGS. 9A and 9B, in some embodiments, each subframe includes one or both of (i) a security tail field (e.g., a message integrity code (MIC)) and (ii) an error detection information field, such as a frame check sequence (FCS) field, a cyclic redundancy check (CRC) field, etc. In an embodiment, each subframe is self-contained so that even if one or more subframes are not correctly received, a receiver can still identify correctly received subframes and request the sender to retransmit only the incorrectly received subframes. In an embodiment, each subframe includes a complete MPDU or A-MPDU. In an embodiment, the first subframe includes a complete MPDU, whereas subsequent subframes include fragments of another MPDU.

In another embodiment, each subframe includes a fragment of a fragmented MPDU. In an embodiment, MMH portions 460 are omitted, such as in the example format of FIG. 9A. When MMH portions 460 are omitted, the entire MPDU must be retransmitted when even only one fragment is not received correctly.

In an embodiment, the first subframe includes a complete MAC header for a fragmented MPDU, an FCS field, and a first fragment of the MPDU. Subsequent subframes each include an MMH portion 460 as in FIG. 9B, and FCS field, and a respective fragment of the MPDU. In this embodiment, fragments of the MPDU that were received correctly need not be retransmitted when only some fragments are not received correctly.

In other embodiments, the PHY processing unit transmits multiple closely spaced PPDUs corresponding to the multiple MPDUs 312, in some scenarios. The closely spaced PPDUs are PPDUs separated only by a short time period, such as the reduced interframe space (RIFS) defined in the IEEE 802.11n Standard or another suitable time duration. For example, it is determined whether multiple MPDUs 312 can be transmitted as multiple PPDUs such that the multiple PPDUs can be transmitted within a TXOP period.

In an embodiment, transmission of MSDU fragments as multiple closely spaced PPDUs is utilized in both the regular mode and the VLR mode. In another embodiment, transmission of MSDU fragments as multiple closely spaced PPDUs is utilized in the regular mode, but is not utilized in the VLR mode.

Figure 10:
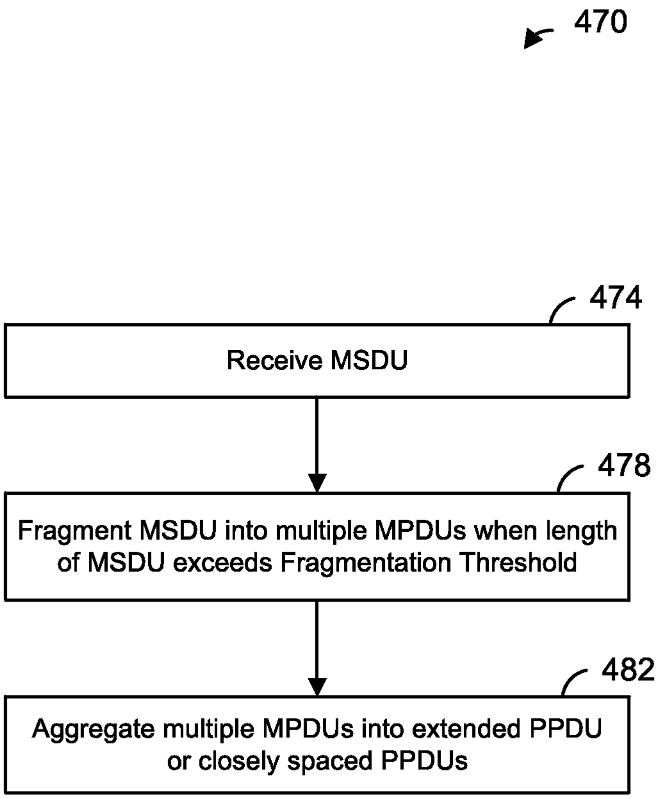
FIG. 10 is a flow diagram of an example method for fragmentation and subsequent aggregation, according to an embodiment.

FIG. 10 is a flow diagram of an example method 470 for fragmentation and subsequent aggregation. In an embodiment, the method 470 is implemented by a network interface unit (such as the network interface 16 and/or the network interface 27). For example, in an embodiment, the method 470 is performed by a MAC processing unit (such as the MAC processing unit 18 and/or the MAC processing unit 28) a PHY processing unit (such as the PHY processing unit 20 and/or the PHY processing unit 2).

At block 474, an MSDU is received. At block 478, the MSDU is fragmented into multiple MPDUs when a length of the MSDU exceeds a fragmentation threshold. The MPDUs generated at block 478 are provided to the PHY processing unit, which generates, at block 482, an extended PPDU or closely spaced PPDUs (such as described above) to aggregate the multiple MPDUs generated at block 478 such that the resulting extended PPDU or closely spaced PPDUs do not exceed a maximum extended PPDU length or TXOP period, in an embodiment.

In an embodiment, the method 470 is performed in the regular mode of operation but is not performed in the VLR mode of operation. In another embodiment, the method 470 is performed in both the regular mode of operation and the VLR mode of operation.

In an embodiment, the method 470 is combined with the method 325 of FIG. 6. For example, MPDUs are aggregated into an A-MPDU such as according to the method 325, and multiple A-MPDUs and/or one A-MPDU with one or more MPDUs are aggregated into an extended PPDU or closely spaced PPDUs in a manner similar to the method 470.

Figure 11:
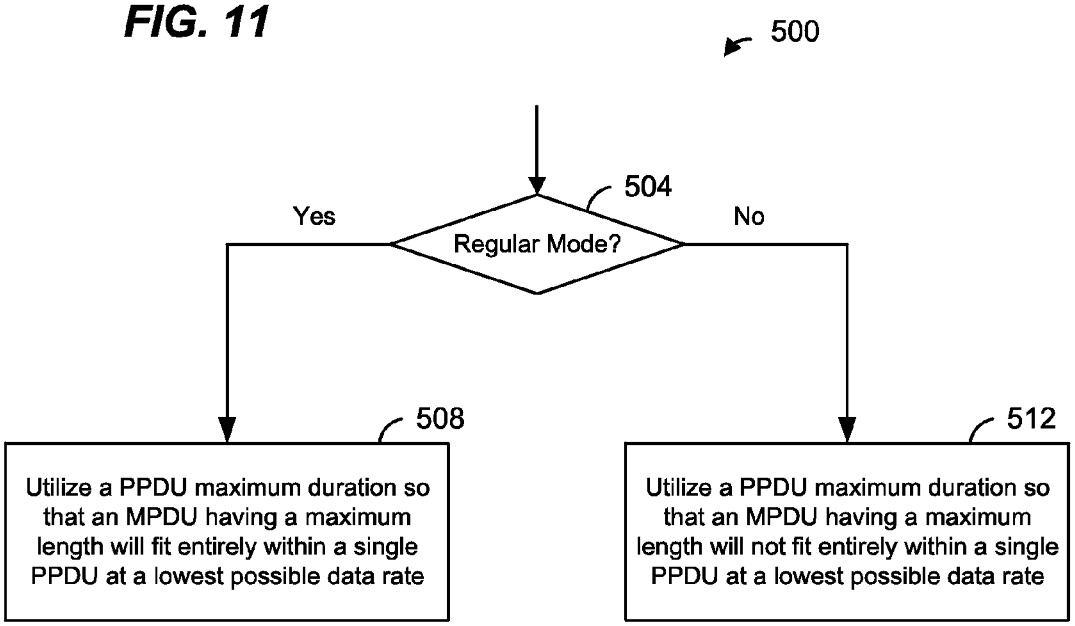
FIG. 11 is a flow diagram of an example method for formatting data units for wireless transmission, according to an embodiment.

FIG. 11 is a flow diagram of an example method 500 for formatting data units for wireless transmission, according to an embodiment. In an embodiment, the method 500 is implemented by a network interface unit (such as the network interface 16 and/or the network interface 27).

At block 504, it is determined whether the current mode of operation is the regular mode or the VLR mode. If it is determined that the current mode of operation is the regular mode, the flow proceeds to block 508. At block 508, a PPDU maximum duration is utilized so that an MPDU having a maximum length defined by the MAC protocol layer in a protocol stack (e.g., 1500 bytes or another suitable length) will fit entirely within a single PPDU when transmitting at a lowest possible data rate of the regular mode. Utilizing such a PPDU maximum duration will help reduce the amount of fragmentation required.

On the other hand, if it is determined at block 504 that the current mode of operation is the VLR mode, the flow proceeds to block 512. At block 512, a PPDU maximum duration is utilized so that an MPDU having a maximum length defined by the MAC protocol layer in a protocol stack (e.g., a maximum Ethernet frame size, a maximum frame size determined by another suitable protocol above the PHY layer in the protocol stack, 1500 bytes or another suitable length, etc.) will not fit entirely within a single PPDU when transmitting at a lowest possible data rate of the VLR mode. In an embodiment, the same PPDU maximum duration is utilized in the regular mode and the VLR mode. In another embodiment, different PPDU maximum durations are utilized in the regular mode and the VLR mode.

Figure 12:
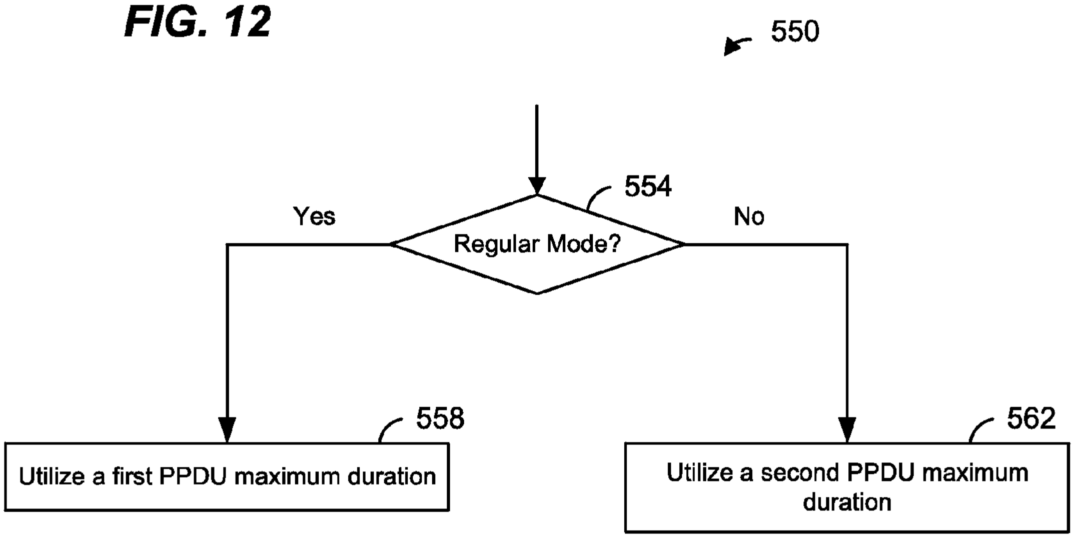
FIG. 12 is a flow diagram of an example method for formatting data units for wireless transmission, according to an embodiment.

FIG. 12 is a flow diagram of an example method 550 for formatting data units for wireless transmission, according to an embodiment. In an embodiment, the method 550 is implemented by a network interface unit (such as the network interface 16 and/or the network interface 27).

At block 554, it is determined whether the current mode of operation is the regular mode or the VLR mode. If it is determined that the current mode of operation is the regular mode, the flow proceeds to block 558. At block 558, a first PPDU maximum duration is utilized. On the other hand, if it is determined at block 554 that the current mode of operation is the VLR mode, the flow proceeds to block 562. At block 562, a second PPDU maximum duration is utilized, where the first PPDU maximum duration is different than the second PPDU maximum duration. In an embodiment, the first PPDU maximum duration is less than the second PPDU maximum duration. In an embodiment, the first PPDU maximum duration is 5 ms, whereas the second PPDU maximum duration is greater than 5 ms (e.g., 10 ms, 15 ms, 20 ms, or another suitable duration).

As discussed above, in some embodiments and/or scenarios, a PPDU may be longer than the 5 ms maximum length defined in the current IEEE 802.11 Standard. For power save (PS) mode purposes, it is beneficial, at least in some embodiments, to enable a receiving station to obtain information quickly about a PPDU being transmitted so that the station can determine (i) whether the station can go back to sleep and/or (ii) for how long the station can sleep. For example, when a station is in a PS mode, the station wakes up periodically to listen for beacon frames and/or frames including a traffic indication map (TIM) to determine whether another station (e.g., the AP 14) has data buffered for the station, in some embodiments. In another embodiment, the other station (e.g., the AP 14) will not send unicast frames to the station in the PS mode unless the other station (e.g., the AP 14) is first prompted to do so by the station in the PS mode. Thus, in some embodiments, a station in a PS mode that wakes up and hears a unicast frame and the station knows that the station has not yet prompted such a unicast frame, the station in the PS mode knows that the unicast frame is not intended for the station. However, the station in the PS mode may want to know the duration of the unicast frame for purposes of (i) going back to sleep, (ii) determining when the station can attempt a transmission, etc. Thus, in some embodiments, information useful (at least in some scenarios) for a station in a PS mode is included in an early portion of a PPDU to enable the station in the PS mode to obtain the information quickly.

Figure 13:
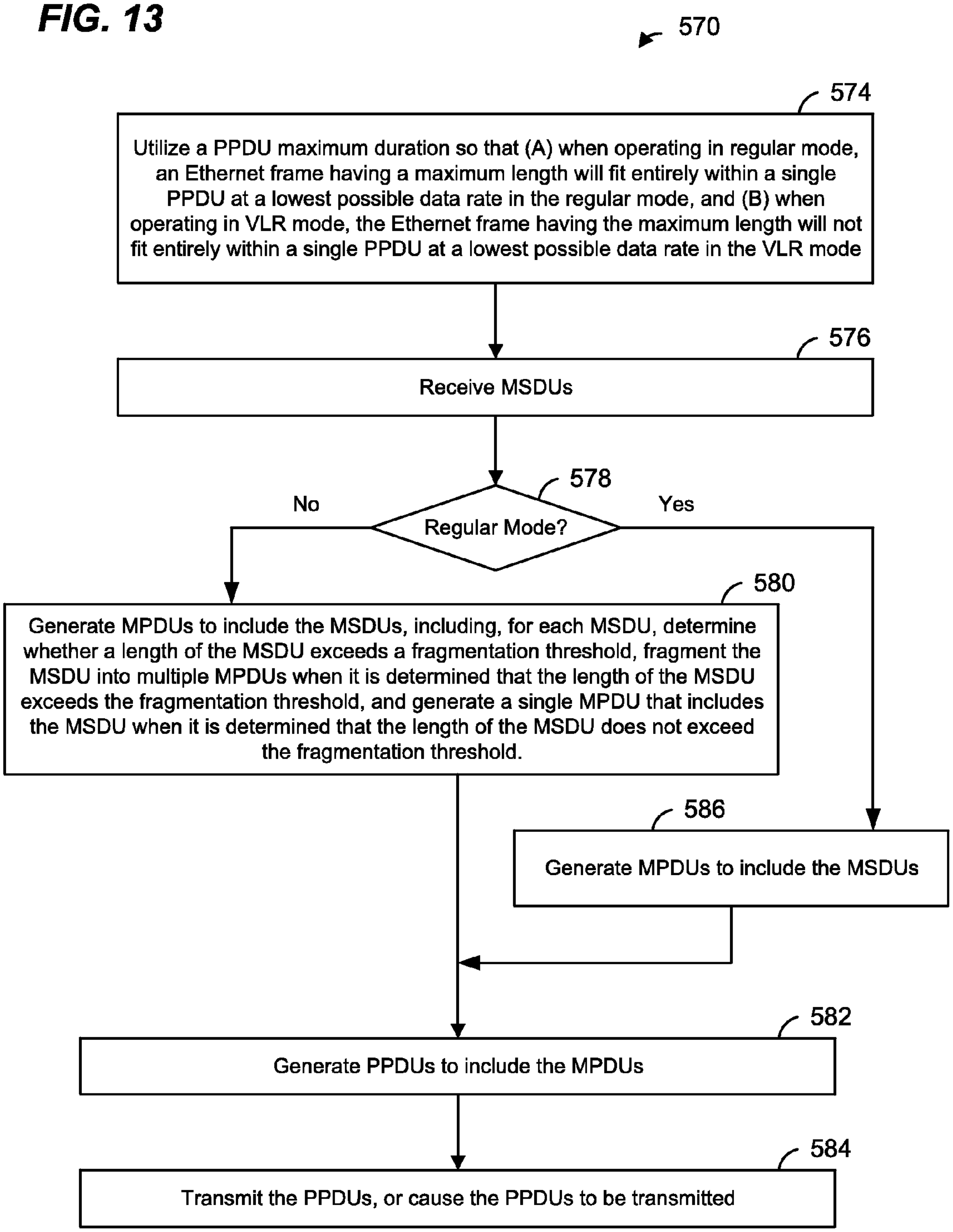
FIG. 13 is a flow diagram of an example method for generating PPDUs, according to an embodiment.

FIG. 13 is a flow diagram of an example method 570 for generating PHY data units for wireless transmission, according to an embodiment. In an embodiment, the method 570 is implemented by a network interface unit (such as the network interface 16 and/or the network interface 27). For example, a network interface is configured to implement the method 570.

At block 574, a PPDU maximum duration is utilized so that (A) when operating in first mode (e.g., the regular mode), an Ethernet frame having a maximum length (as specified by a MAC protocol, e.g., the IEEE 802.3 Standard) will fit entirely within a single PPDU at a lowest possible data rate in the first mode, and (B) when operating in a second mode (e.g., the VLR mode), the Ethernet frame having the maximum length will not fit entirely within a single PPDU at a lowest possible data rate in the VLR mode.

At block 576, MSDUs are received. At block 578, it is determined whether the MSDUs are to be transmitted in the first mode (e.g., regular mode) or the second mode (VLR mode). When the MSDUs are to be transmitted in the second mode, the flow proceeds to block 580. At block 580, MPDUs to include the MSDUs are generated. For each MSDU, it is determined whether a length of the MSDU exceeds a fragmentation threshold. When the MSDU length exceeds the fragmentation threshold, multiple MPDUs are generated to include different fragments of the MSDU. When the MSDU length does not exceed the fragmentation threshold, a single MPDU is generated to include the MSDU.

At block 582, PPDUs are generated to include the MPDUs. Each PPDU has a duration less than or equal to the maximum PPDU duration. At block 584, the PPDUs are transmitted, or caused to be transmitted. For example, a PPDU is transmitted according to the first mode when it is determined that the first mode is to be utilized, whereas the PPDU is transmitted according to the second mode when it is determined that the second mode is to be utilized.

On the other hand, if it is determined at block 578 that the MSDUs are to be transmitted in the first mode (e.g., regular mode), the flow proceeds to block 586. At block 586, MPDUs are generated to include the MSDUs. In an embodiment, block 586 omits comparing MSDU lengths to a fragmentation threshold. In another embodiment, block 586 includes fragmentation the same as block 580 except that a different (e.g., longer) fragmentation threshold is utilized. In other words, block 580 may utilize a first fragmentation threshold, whereas block 586 utilizes a second fragmentation threshold that is larger than the first fragmentation threshold.

The flow proceeds from block 586 to block 582.

In other embodiments, block 574 involves utilizing a PPDU maximum duration that is determined based on maximum length of a data unit other than an Ethernet frame, such as a data unit (i) defined by another suitable protocol in a layer above the PHY protocol in a protocol stack and (ii) having a maximum length defined by the protocol above the PHY protocol.

In some embodiments and/or scenarios, the method 570 of FIG. 13 enables avoiding any fragmentation of MSDUs when operating in the regular mode, whereas fragmentation of MSDUs may still occur when operating in the regular mode.

Figure 14:
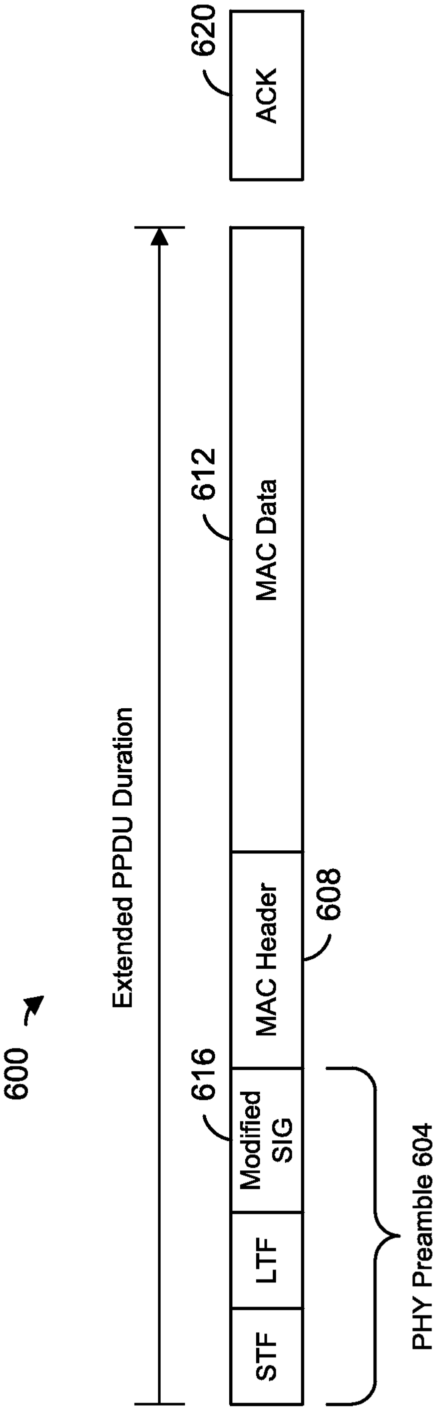
FIG. 14 is a diagram of a PPDU format, according to an embodiment.

FIG. 14 is a block diagram of a format for a PPDU 600 with an extended duration (as compared to the current IEEE 802.11 Standard), according to an embodiment. The PPDU 600 includes a PPDU preamble portion 604, a MAC header portion 608, and a MAC data portion 612. The PHY preamble portion 604 includes a signal field 616.

In an embodiment, the signal (SIG) field 616 includes a duration field that indicates a duration of the PPDU 600. When the duration field is included in the SIG field 616 rather than in a MAC header, a receiver is able to determine the duration of a transmission more quickly and can go to sleep more quickly, at least in some embodiments, if the receiver determines that the receiver does not need to listen to the PPDU 600.

In an embodiment, the signal field includes a response indication field that indicates whether there is to be a response (e.g., an acknowledgment 620) to the PPDU 600 immediately following the PPDU 600. In an embodiment, a receiver can calculate a duration of the response. For example, the receiver assumes a data rate and length of the response to determine the duration of the response. In an embodiment, the receiver assumes the data rate of the response to be the same as the date rate of the PPDU 600, or another suitable data rate. When the receiver is able to determine if a response will be transmitted and can determine or estimate the duration of the response, the receiver can go to sleep for period including both the transmission of the PPDU 600 and the response (e.g., ACK) to the PPDU 600, at least in some embodiments, if the receiver determines that the receiver does not need to listen to the PPDU 600.

In an embodiment, in the VLR mode, a duration field in the MAC header 608 is omitted if only one frame exchange is allowed for each TXOP in the VLR mode. For example, a receiver can estimate the duration of the PPDU and the response based on the length of the TXOP.

In an embodiment, the signal field 616 includes a field that indicates whether the PPDU 600 corresponds to a unicast frame. For example, as discussed above, a station in a PS mode can ignore unicast frames (at least in some scenarios) but should listen to group-addressed and broadcast frames. Thus, at least in some embodiments and/or scenarios, locating the field that indicates whether the PPDU 600 corresponds to a unicast frame in the SIG field 616 allows a receiver to go to sleep more quickly than if the receiver needed to process the MAC header to determine if the PPDU 600 corresponds to a unicast frame.

In an embodiment, the signal field 616 includes a field that indicates whether the PPDU 600 is a beacon frame, a TIM frame, and/or a frame including a TIM element. For example, station in a PS mode is interested in at least some scenarios, when waking up, in receiving beacon frames, TIM frames, and/or frames including TIM elements. As another example, a station operating in the regular mode is interested, in at least some scenarios, in beacon frames transmitted in the VLR mode and/or frames including TIM elements that were transmitted in the VLR mode. In another embodiment, a station operating in the regular mode ignores all PPDUs transmitted in the VLR mode. At least in some embodiments and/or scenarios, locating a field that indicates whether the PPDU 600 a beacon frame, a TIM frame, and/or a frame including a TIM element in the SIG field 616 allows a receiver to go to sleep more quickly than if the receiver needed to process the MAC header to determine if the PPDU 600 is a beacon frame, a TIM frame, and/or a frame including a TIM element.

In an embodiment, the signal field 616 includes a field that indicates whether the PPDU 600 is being transmitted to the AP or from the AP. For example, a station is interested, in at least some scenarios, in PPDUs transmitted from the AP. Thus, at least in some embodiments and/or scenarios, locating the field that indicates whether the PPDU 600 is transmitted by the AP in the SIG field 616 allows a receiver to go to sleep more quickly than if the receiver needed to process the MAC header to determine if the PPDU 600 was transmitted by the AP.

In some embodiments, the MAC header 608 is modified to include a destination address (DA) and/or a network identifier (ID) earlier in the MAC header 608 as compared to the MAC header defined by the current IEEE 802.11 Standard. For example, a station listening for unicast frames addressed to the station must process at least a portion of the MAC header 608 to determine if the MAC header includes a DA that corresponds to the station. For example, a DA field immediately follows a frame control (FC) field, in an embodiment. As another example, a DA field is the first field in the MAC header, in another embodiment. In some embodiments and/or scenarios in which the MAC header includes a network ID field, the network ID field immediately follows the DA field, and the DA field is either (i) immediately following the FC field, or (ii) the first field in the MAC header. Thus, at least in some embodiments and/or scenarios, locating the DA and/or a network ID earlier in the MAC header 608 allows a receiver to go to sleep more quickly than if the receiver needed to process more of the MAC header to determine the DA and/or the network ID.

A network interface (such as the network interface 16 and/or the network interface 27) is configured to generate a PPDU 600, in an embodiment.

Figure 15:
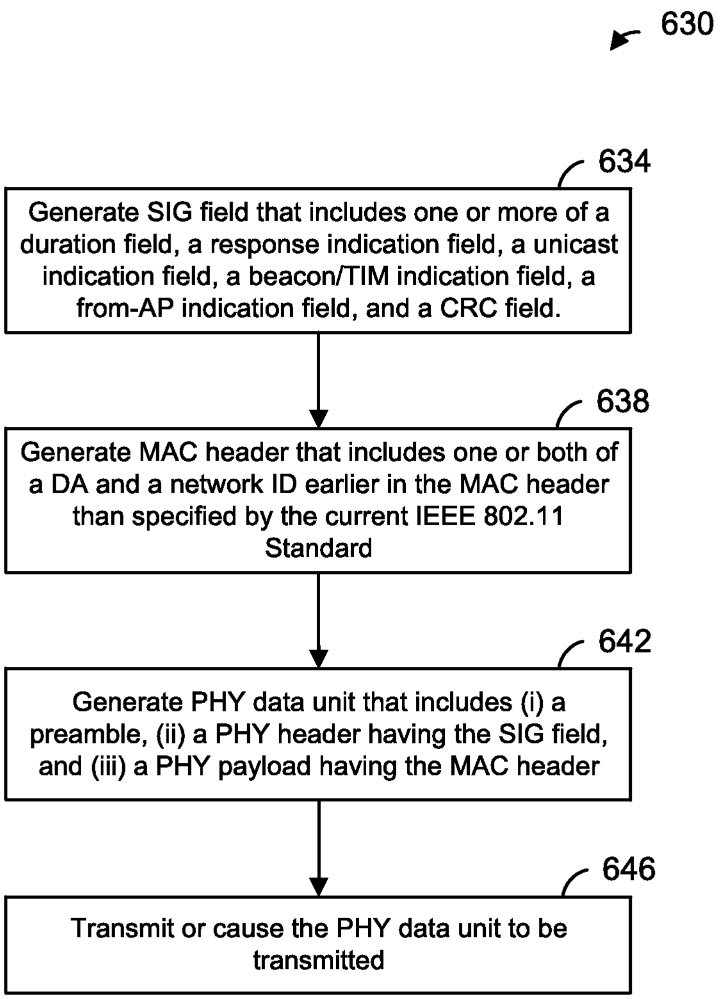
FIG. 15 is a flow diagram of an example method for generating a PHY data unit, according to an embodiment.

FIG. 15 is a flow diagram of an example method 630 for generating PHY data units for wireless transmission, according to an embodiment. In an embodiment, the method 630 is implemented by a network interface unit (such as the network interface 16 and/or the network interface 27). For example, a network interface is configured to implement the method 630. In some embodiments, the method 630 is for generating a PPDU discussed above with respect to FIG. 14, or another suitable PPDU.

At block 634, a SIG field is generated, wherein the SIG field includes any combination of one or more of the following: (i) a duration field to indicate a length of a PPDU, (ii) a response indication field to indicate whether a response (e.g., an ACK, BA, etc.) will follow the PPDU, (iii) a unicast indication field to indicate whether the PPDU corresponds to a unicast transmission, (iv) a beacon/TIM indication field to indicate whether the PPDU is a beacon frame, a TIM frame, and/or a frame including a TIM element, (v) a field that indicates of whether the PPDU is being transmitted by an AP, and (vi) a CRC field.

At block 638, a MAC header is generated such that one or both of (i) a DA field, and (ii) a network ID field occur earlier in the MAC header than specified by the current IEEE 802.11 Standard. For example, a DA field immediately follows an FC field in the MAC header, in an embodiment. As another example, a DA field is the first field in the MAC header, in another embodiment. In some embodiments and/or scenarios in which the MAC header includes a network ID field, the network ID field immediately follows the DA field, and the DA field is either (i) immediately following the FC field, or (ii) the first field in the MAC header. In some embodiments, block 638 is omitted.

At block 642, a PHY data unit is generated to include a preamble, a PHY header having the SIG field generated at block 634. In some embodiments, the PHY data unit is generated to include a PHY payload. In some embodiments, the PHY payload includes the MAC header generated at block 638. In some embodiments, the PHY payload includes the MAC header that is not generated according to block 638. In some embodiments, the PHY data unit is generated to omit a PHY payload.

At block 646, the PHY data unit is transmitted or caused to be transmitted.

Some broadcast and/or control frames cannot be fragmented, at least in some embodiments. Thus, in various embodiments, various control frames are modified to have shorter durations as compared to similar control frames described in the current IEEE 802.11 Standard, for example.

For example, in some embodiments, a network interface of a station (e.g., the AP 14), generates beacons having less information as compared to the beacons described in the current IEEE 802.11 Standard, for example. In an embodiment, a beacon frame includes certain basic service set (BSS) information such as a timestamp, a beacon interval, a service set identifier (SSID), etc., but omits other information that is included in beacons described in the current IEEE 802.11 Standard, for example. In an embodiment, the beacon includes recently updated (e.g., updated since the immediately previous beacon was transmitted, updated within a certain amount of time, etc.) BSS information. In an embodiment, if a number of BSS information elements (IEs) that recently changed is large enough so that all of the IEs that recently changed cannot fit within one beacon frame, the network interface may be configured to distribute the IEs that recently changed amongst several beacon frames. In another embodiment, if a number of BSS information elements (IEs) that recently changed is large enough so that all of the IEs that recently changed cannot fit within one beacon frame, the network interface may be configured to include in the beacon an indication of changed BSS IEs that prompts stations to poll the AP to cause the AP to transmit the changed BSS IEs in response to the poll. For example, the beacon includes a field that indicates whether BSS IEs have changed and that prompts stations to poll the AP to cause the AP to transmit the changed BSS IEs in response to the poll, in an embodiment. In an embodiment, in response to such a poll, the network interface of the AP transmits information that conveys the changed IEs to the polling station. In an embodiment, a station polls the AP for information regarding changed IEs using a probe request frame, and the AP responds to the probe request frame with a probe response frame, where the probe response frame includes the requested information.

In an embodiment, a station new to a BSS transmits a probe request frame to the AP to obtain detailed BSS information from the AP. In response to the probe request, detailed BSS information is transmitted by the AP in a probe response frame.

In an embodiment, a probe response frame is divided into multiple probe response frames (short probe response frames) thus shortening the duration of each probe response frame as compared to a single probe response frame. Each short probe response frame includes a field to indicate whether at least one additional probe response frame is to follow, in an embodiment. In an embodiment, each short probe response frame includes a SN field to facilitate selective acknowledgment of short probe response frames and retransmission of short probe response frames that were not received correctly. In an embodiment, all of the short probe response frames are transmitted in response to a single probe request frame. In another embodiment, a station transmits multiple probe request frames to prompt the AP to transmit the multiple short probe response frames.

A TIM information element and/or TIM frame is utilized to inform a station whether the AP has buffered data for the station. When there are many stations in a BSS, the TIM element and/or frame can be very large, and thus a frame including a TIM element or a TIM frame can be very long, in some situations.

In an embodiment, the TIM information element or TIM frame includes a list of indicators (e.g., a bitmap) that indicates for which stations the AP has buffered data. In an embodiment, each indicator in the list (e.g., each bit in the bitmap) corresponds to a group association identifier (Group AID), and each Group AID is a group ID for a group of stations in the BSS. In an embodiment, when a Group AID indicator in the TIM element or TIM frame indicates data is buffered for the indicated group of stations, each station in the group, in response, polls the AP to determine whether the AP has data buffered for the station. When an AP receives such a poll, the AP, in response, determines whether there is data buffered for the station. If there is data buffered for the station, the AP transmits buffered data the station. In an embodiment, the AP also transmits, along with buffered data, an indication of whether the AP has more buffered data for the station. On the other hand, if the AP determines, in response to a poll from a station, that the AP does not have buffered data for the station, the AP transmits an indication that the AP does not have buffered data for the station.

In another embodiment, when an AP receives such a poll, the AP, in response, generates a frame that includes the TIM information element, where the TIM information element indicates for which stations the AP has buffered data, and transmits the frame to the group of stations. This is helpful to other stations in the group that have not yet transmitted a poll to the AP. In another embodiment, when an AP receives such a poll, the AP, in response, generates a frame that includes the TIM information element, where the TIM information element indicates for which stations the AP has buffered data, and transmits the frame as a unicast frame to the polling station. In an embodiment, when an indicator in the TIM information element indicates data is buffered for a particular station, the station, in response, polls the AP to prompt the AP to transmit buffered data buffered to the station.

In another embodiment, when an AP receives such a poll, the AP, in response, generates a frame that includes a segment of TIM information element, where the segment of the TIM information element includes information that indicates for which stations in the group the AP has buffered data, and transmits the frame to the group of stations. This is helpful to other stations in the group that have not yet transmitted a poll to the AP. In another embodiment, when an AP receives such a poll, the AP, in response, generates a frame that includes a segment of TIM information element, where the segment of the TIM information element includes information that indicates for which stations in the group the AP has buffered data, and transmits the frame to the polling station. In an embodiment, when an indicator in the segment of the TIM information element indicates data is buffered for a particular station, the station, in response, polls the AP to prompt the AP to transmit buffered data buffered to the station.

In another embodiment, the TIM information element is segmented and distributed amongst multiple beacon frames, TIM frames, etc. In an embodiment, each TIM segment includes information that enables a receiving station to determine when a segment corresponding to the station will be transmitted. Thus, in an embodiment, when a station in a PS mode wakes up and receives a TIM segment, the station uses information in the received TIM segment to determine when another TIM segment corresponding to the station will be transmitted. The station can then go back to sleep until an appropriate time when the other TIM segment corresponding to the station will be transmitted.

In another embodiment, both (i) a TIM information element with indications of Group AIDs for which the AP has buffered data (a Group TIM) and (ii) segmented TIM information elements (a segmented TIM) are transmitted by the AP. In an embodiment, a station first checks the Group TIM in an attempt to determine whether the AP has data buffered for the station. If the station can determine, based on the Group TIM, that the AP does not have data buffered for the station, the station can go back to sleep without checking the segmented TIM. If the station cannot determine, based on the Group TIM, whether the AP has data buffered for the station, the station then analyzes an appropriate TIM segment to determine whether the AP has data buffered for the station.

In an embodiment in which a single AP supports multiple basic service set identifiers (BSSIDs), a station new to a BSS transmits a probe request frame to the AP to obtain completed multiple BSSID information from the AP.

In an embodiment in which a single AP supports BSSIDs, if one or more multiple non-transmitted BSSID (e.g., virtual APs for which separate beacons are not transmitted) profiles have changed information, the AP distributes the updated BSS information in multiple beacon frames. In another embodiment in which a single AP supports BSSIDs, if one or more multiple non-transmitted BSSID profiles have changed information, the AP generates a frame (e.g., a beacon frame) with an indicator of changed BSS information, and transmits the frame to stations of one or more corresponding BSSIDs to prompt the stations to send probes to the AP to obtain the changed BSS information. For example, the indictor is a BSS update field that indicates whether BSS information updates are available for each non-transmitted BSSID, in an embodiment. As another example, the indictor is a BSS update field that indicates whether BSS information updates are available for each transmitted and non-transmitted BSSID, in an embodiment.

Figure 16:
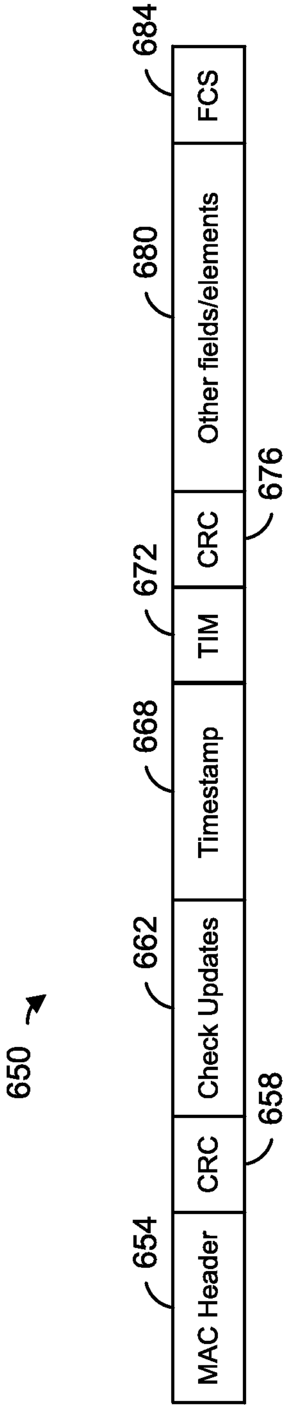
FIG. 16 is a diagram of an example beacon frame, according to an embodiment.

In some embodiments, one or more error detection information fields are included in a frame (e.g., a data frame, a management frame, a beacon frame, etc.) to enable receiving stations to verify relevant fields and skip other fields if not needed (e.g., to allow a station to go to sleep sooner for power saving). FIG. 16 is a diagram of an example beacon frame 650 according to an embodiment. A network interface (such as the network interface 16) is configured to generate the beacon frame 650, in an embodiment.

The beacon frame 650 includes a MAC header 654 and a CRC field 658. The CRC field 658 is generated using the MAC header 654 so that a receiver can utilize the CRC field 658 to verify the integrity of the MAC header 654 and analyze information in the MAC header 654 without having to process other later portions of the beacon frame 650. Thus, in some situations, a receiving station can stop processing the remainder of the frame 650 when it determines, after analyzing the MAC header 654, that the frame 650 is not intended for the station. For example, if a receiving station determines that a DA address in the MAC header 654 does not correspond to the receiving station, the receiving station may stop processing the remainder of the frame 650.

The beacon frame 650 also includes a check updates field 662, a timestamp field 668, a TIM field 672 and a CRC field 676. The CRC field 676 is generated using the check updates field 662, the timestamp field 668, and the TIM field 672 so that a receiver can utilize the CRC field 676 to verify the integrity of the check updates field 662, the timestamp field 668, and/or the TIM field 672, and analyze information in the check updates field 662, the timestamp field 668, and/or the TIM field 672 without having to process other portions of the beacon frame 650. Thus, in some situations, a receiving station can stop processing the remainder of the frame 650 when it determines, after analyzing the check updates field 662, the timestamp field 668, and/or the TIM field 672, that the station does not need to further process the frame 650. For example, if a receiving station determines, from the TIM field 672, that the AP does not have buffered data for the station, the receiving station may stop processing the remainder of the frame 650.

The beacon frame 650 also includes other fields and/or elements 680 and an FCS field 684. In an embodiment, the FCS field 684 is generated using the fields 680 and without using one or more of the MAC header 654, the CRC 658, the check updates field, the TIM field 672 or the CRC field 676. In another embodiment, the FCS field 684 is generated using the MAC header 654, the CRC 658, the check updates field, the TIM field 672 the CRC field 676, and the other fields 680.

In an embodiment, the CRC field 658 is omitted. In an embodiment in which the CRC field 658 is omitted, the CRC field 676 is generated using the MAC header field 654. In another embodiment, the CRC field 676 is omitted.

In embodiments in which a network interface decides to stop further processing of the frame 650, the network interface may enter a sleep mode for the remainder of the frame 650 to reduce energy consumption.

Figure 17:
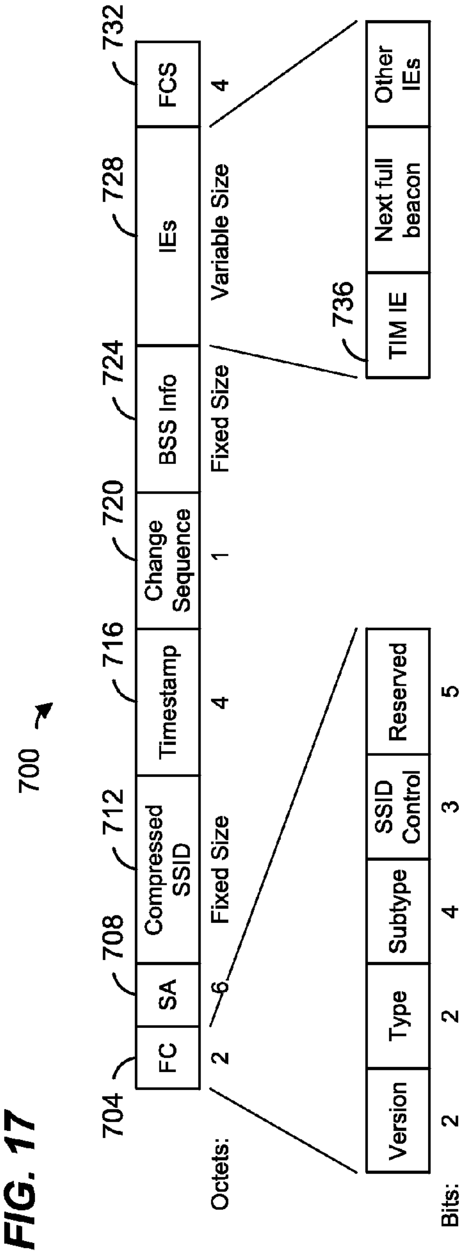
FIG. 17 is a diagram of another example beacon frame, according to another embodiment.

In some embodiments, a beacon frame has a shorter length as compared to beacon frames defined by the current IEEE 802.11 Standard. FIG. 17 is a diagram of an example beacon frame 700 according to an embodiment. A network interface (such as the network interface 16) is configured to generate the beacon frame 700, in an embodiment.

The beacon frame 700 includes a frame control field 704, a source address (SA) field, a compressed SSID field 712, a timestamp field 716, a change sequence field 720, a BSS information field 724, an IE payload field 728, and an FCS field 732. The beacon payload field 728 includes information elements (IEs) such as a TIM IE 736. In an embodiment, the TIM IE 736 is the first IE in the IE payload field 728. In an embodiment, the compressed SSID field 712 contains a compressed version of a full SSID (as defined in the current IEEE 802.11 Standard). In an embodiment, the compressed SSID field 712 includes a concatenated version (e.g., less bits) of the full SSID. In other embodiments, other compression techniques are utilized.

Often, an associated station checks only certain fields of the beacon frame 700 to determine whether (i) the station should check other fields of the beacon frame 700, or (ii) the station can ignore the remaining portions of the beacon frame 700. For example, a station may need to check one or more of (i) the timestamp field 716, (ii) the change sequence field 720 (which indicates whether BSS information has changed and thus whether the station should process other fields of the beacon frame 700 to determine what BSS information has changed), or (iii) the TIM IE 736. The beacon frame 700 is formatted such that all fields prior to each of (i) the timestamp field 716, (ii) the change sequence field 720, and (iii) the TIM IE 736 are fixed-length fields. This simplifies parsing of (i) the timestamp field 716, (ii) the change sequence field 720, and (iii) the TIM IE 736 in the beacon frame 700. On the other hand, variable length fields make field location and/or parsing more difficult and/or more complicated.

In another embodiment, the timestamp field 716 is located immediately following the SA field 708.

In another embodiment, device discovery information is included in the BSS info field 724 or as an IE in the IE payload field 728. In another embodiment, service discovery information is included in the BSS info field 724 or as an IE in the IE payload field 728.

Figure 18:
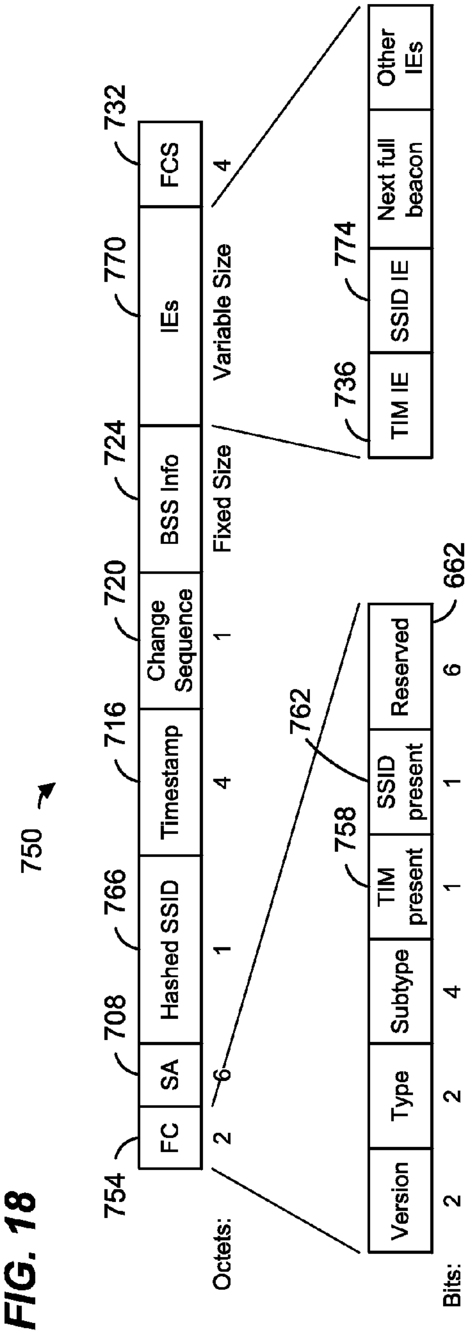
FIG. 18 is a diagram of another example beacon frame, according to another embodiment.

FIG. 18 is a diagram of another example beacon frame 750 according to another embodiment. A network interface (such as the network interface 16) is configured to generate the beacon frame 750, in an embodiment. The beacon frame 750 is similar to the beacon frame 700 of FIG. 17, and like-numbered elements are not discussed in detail.

The beacon frame 750 includes a frame control field 754, which includes a TIM IE indicator subfield 758 and an SSID IE indicator subfield 762. The TIM IE indicator subfield 758 indicates whether a TIM IE is present in the beacon frame 750. Similarly, the SSID IE indicator subfield 762 indicates whether an SSID IE is present in the beacon frame 750.

The beacon frame 750 also includes a hashed SSID field 766. In an embodiment, a hashing function is applied to a full SSID (e.g., as specified in the current IEEE 802.11 Standard) to generate the hashed SSID 766.

The beacon frame 750 also includes an IE payload field 770. In an embodiment, the TIM IE 736, when present, is the first IE in the IE payload field 770. In an embodiment, an SSID IE 774, when present, is the first IE in the IE payload field 770 when the IE payload field 770 does not include the TIM IE 736. The SSID IE 774 includes the full SSID, in an embodiment. In an embodiment, the SSID IE 774 immediately follows the TIM IE 736, when both the SSID IE 774 and the TIM IE 736 are present. In another embodiment, the order of the SSID IE 774 and the TIM IE 736 are reversed. In an embodiment, the TIM IE indicator subfield 758 indicates whether the TIM IE 736 is present in the IE payload 770, and the SSID IE indicator subfield 762 indicates whether the SSID IE 774 is present in the IE payload 770.

Similar to the beacon frame 700, the beacon frame 750 is formatted such that all fields prior to each of (i) the timestamp field 716, (ii) the change sequence field 720, and (iii) the TIM IE 736, when present, are fixed-length fields. This simplifies parsing of (i) the timestamp field 716, (ii) the change sequence field 720, and (iii) the TIM IE 736 in the beacon frame 750. On the other hand, variable length fields make field location and/or parsing more difficult and/or more complicated.

In another embodiment, the timestamp field 716 is located immediately following the SA field 708.

In another embodiment, device discovery information is included in the BSS info field 724 or as an IE in the IE payload field 770. In another embodiment, service discovery information is included in the BSS info field 724 or as an IE in the IE payload field 770.

Figure 19:
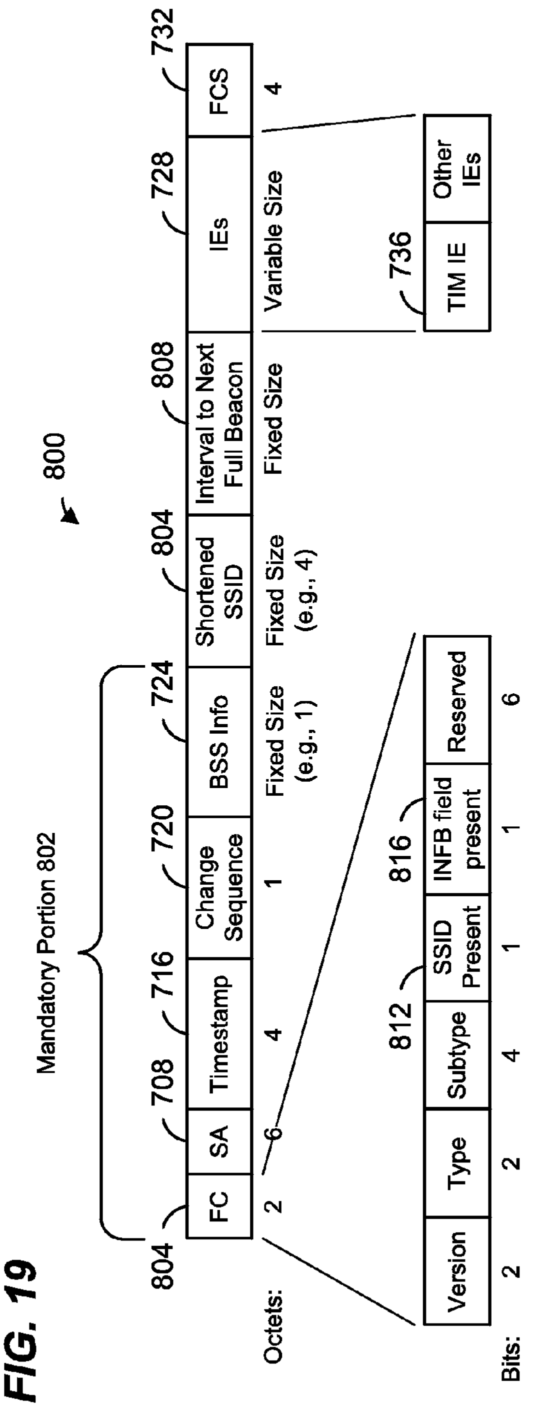
FIG. 19 is a diagram of another example beacon frame, according to another embodiment.

FIG. 19 is a diagram of another example beacon frame 800 according to another embodiment. A network interface (such as the network interface 16) is configured to generate the beacon frame 800, in an embodiment. The beacon frame 800 is similar to the beacon frame 700 of FIG. 17, and like-numbered elements are not discussed in detail.

The beacon frame 800 includes a mandatory portion 802 that includes fields that are included in the beacon frame 800 in all situations. In an embodiment, the mandatory portion 802 includes fields that are likely important to stations in many circumstances. The mandatory portion 802 is positioned at the beginning of the beacon frame 800 and includes fixed-length fields at fixed positions to simplify and enable quick parsing of the fields in the mandatory portion 802. In an embodiment, the mandatory portion 802 includes a frame control field 804, the SA field 708, the timestamp field 716, the change sequence field 720 and the BSS information field 724.

In an embodiment, following the mandatory portion 802, the beacon frame 800 includes one or more optional fields that may be omitted in some scenarios. For example, the beacon frame 800 includes a shortened SSID field 804 and an interval to next full beacon field 808, at least in some circumstances. The frame control field 804 includes at least some indications of which optional fields are included in the beacon frame 800. For example, the frame control field 804 includes a subfield 812 that indicates whether the shortened SSID field 804 is present in the beacon frame 800, in an embodiment. Also, the frame control field 804 includes a subfield 816 that indicates whether the interval to next full beacon field 808 is present in the beacon frame 800, in an embodiment. In an embodiment, the optional fields are located after the mandatory portion 802 and prior to the IE payload 728.

In an embodiment, the shortened SSID (e.g., as compared to the full SSID specified in the current IEEE 802.11 Standard) is a concatenated version of the full SSID field, a hashed version of the full SSID, etc.

Similar to the beacon frame 700 and the beacon frame 750, the beacon frame 800 is formatted such that all fields prior to each of (i) the timestamp field 716, (ii) the change sequence field 720, and (iii) the TIM IE 736, when present, are fixed-length fields. This simplifies parsing of (i) the timestamp field 716, (ii) the change sequence field 720, and (iii) the TIM IE 736 in the beacon frame 800.

Figure 20:
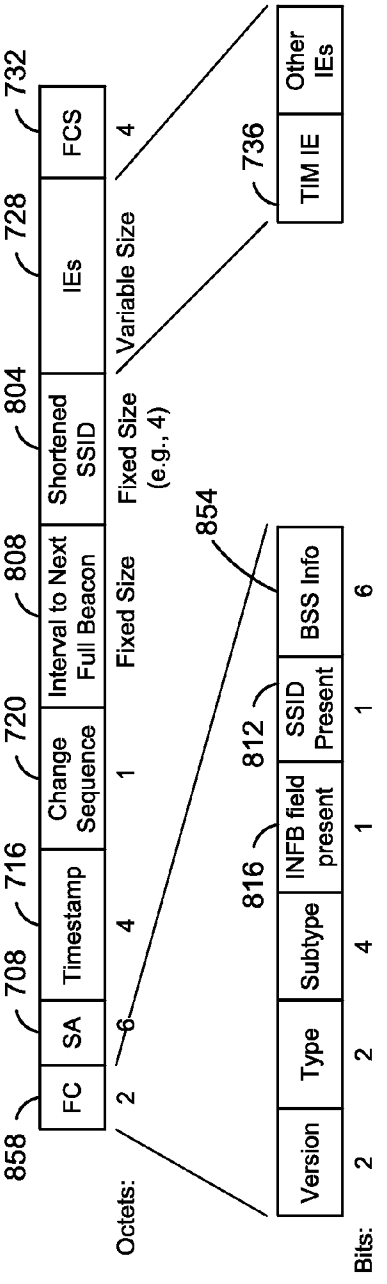
FIG. 20 is a diagram of another example beacon frame, according to another embodiment.

FIG. 20 is a diagram of another example beacon frame 850 according to another embodiment. A network interface (such as the network interface 16) is configured to generate the beacon frame 800, in an embodiment. The beacon frame 850 is similar to the beacon frame 800 of FIG. 19, and like-numbered elements are not discussed in detail.

The beacon frame 850 is similar to the beacon frame 800 of FIG. 19 except for several differences. For example, the BSS information has been moved to a subfield 854 within a frame control field 858. Additionally, the order of the fields 804 and 808 has been changed. Similarly, the order of the subfields 812 and 816 has been changed.

In another embodiment, the BSS information is included in the IE payload 728. In another embodiment, a first subset of BSS information is included in the mandatory portion 802, and a second subset of BSS information is included after the mandatory portion and prior to the IE payload 728. In another embodiment, a first subset of BSS information is included in the mandatory portion 802, and a second subset of BSS information is included in the IE payload 728.

FIG. 20 is a diagram of another example beacon frame 900 according to another embodiment. A network interface (such as the network interface 16) is configured to generate the beacon frame 800, in an embodiment. The beacon frame 900 is similar to the beacon frame 850 of FIG. 20, and like-numbered elements are not discussed in detail.

The beacon frame 900 includes support for HotSpot 2.0 (HS 2.0), which is a standard to facilitate seamless mobile handset handoffs between cellular and Wi-Fi networks. For example, the beacon frame 900 includes optional fields for including important HS 2.0 information to help client stations to discover and select desired APs quickly.

The beacon frame 900 includes a mandatory portion 902, which includes a frame control field 904. Additionally, the beacon 900 includes an optional field 908 (Short NetID 908) that can be interpreted several different ways. For example, the Short NetID 908 can be interpreted as a shortened SSID field or a field that provides HS 2.0 information, as discussed below.

The frame control field 904 includes a NetID control field 912, which indicates (i) whether the Short NetID 908 is present in the beacon frame 900, and (ii) if present, how the Short NetID 908 is to be interpreted, in an embodiment. Table 3 is shows how the NetID control field 912 is utilized to interpret the Short NetID 908, in an embodiment.

TABLE 3

| NetID Control | Interpretation of Short NetID 908 |
|---|---|
| 00 | Not present |
| 01 | Shortened SSID |
| 10 | Hashed SSID |
| 11 | HS 2.0 Information |

Figure 21:
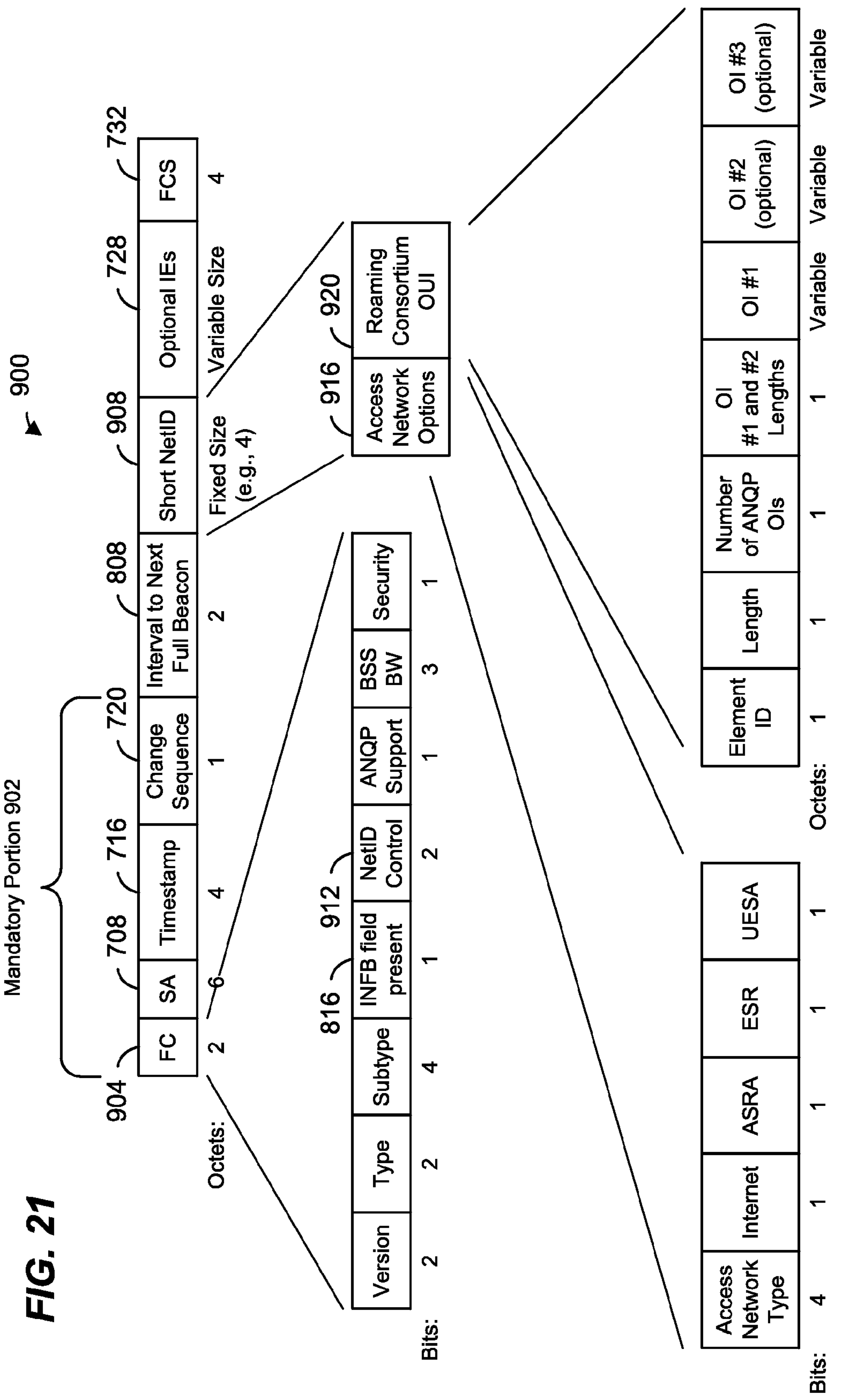
FIG. 21 is a diagram of another example beacon frame, according to another embodiment.

FIG. 21 illustrates the Short NetID 908 interpreted as HS 2.0 information. The Short NetID 908 includes an access network options field 916 and a roaming consortium organizationally unique identifier (OUI) field 920.

Figure 22:
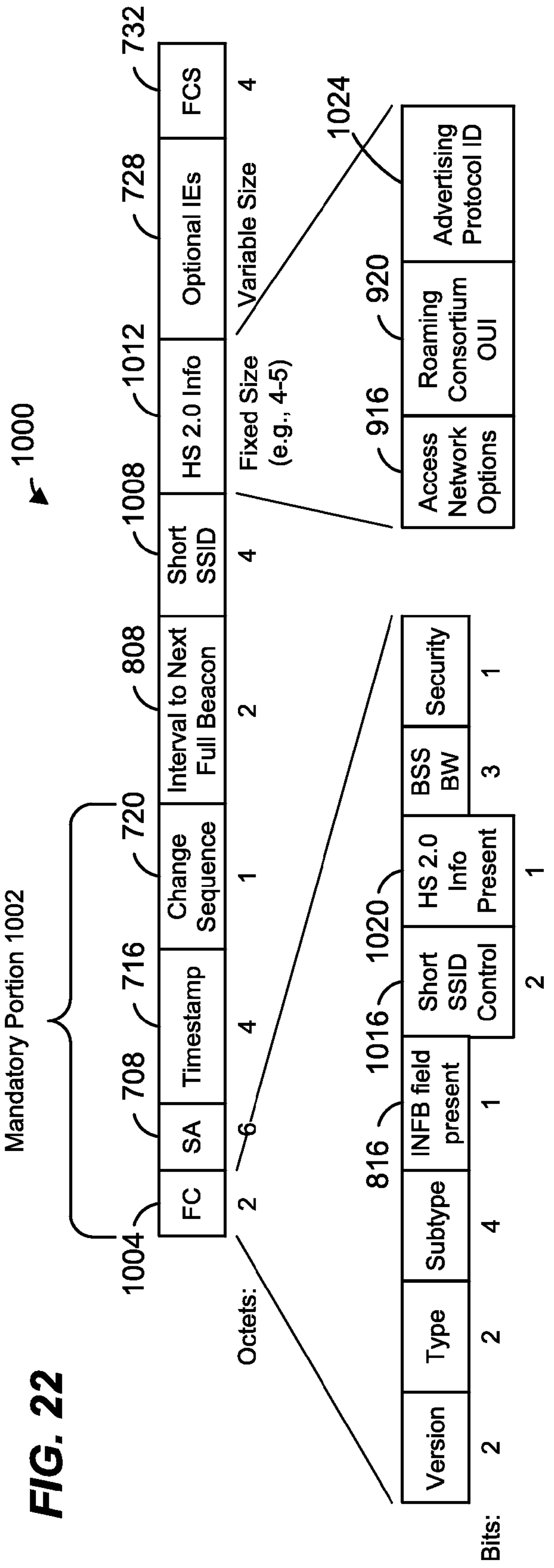
FIG. 22 is a diagram of another example beacon frame, according to another embodiment.

FIG. 22 is a diagram of another example beacon frame 1000 according to another embodiment. A network interface (such as the network interface 16) is configured to generate the beacon frame 800, in an embodiment. The beacon frame 1000 is similar to the beacon frame 900 of FIG. 21, and like-numbered elements are not discussed in detail.

The beacon frame 1000 includes a mandatory portion 1002, which includes a frame control field 1004. Additionally, the beacon frame 1000 includes an optional short SSID field 1008 and an optional HS 2.0 information field 1012. In an embodiment, the short SSID field 1008 can be interpreted as a shortened SSID field or a hashed SSID field.

The frame control field 1004 includes a short SSID control field 1016, which indicates (i) whether the short SSID field 1008 is present in the beacon frame 1000, and (ii) if present, how the short SSID field 1008 is to be interpreted, in an embodiment. The frame control field 1004 also includes an HS 2.0 information present subfield 1020 which indicates whether the HS 2.0 information field 1012 is present in the beacon 1000.

In an embodiment, the HS 2.0 field includes an advertising protocol ID field 1024. In another embodiment, the HS 2.0 field omits the advertising protocol ID field 1024.

Figure 23:
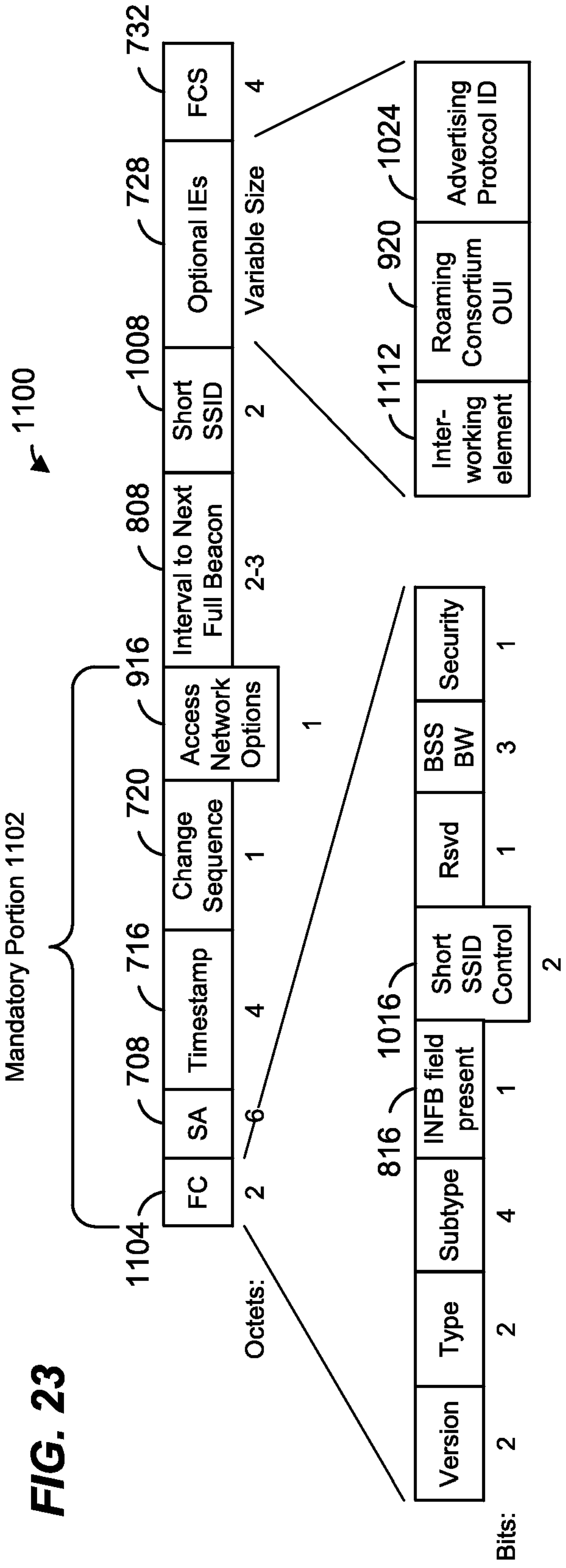
FIG. 23 is a diagram of another example beacon frame, according to another embodiment.

FIG. 23 is a diagram of another example beacon frame 1100 according to another embodiment. A network interface (such as the network interface 16) is configured to generate the beacon frame 800, in an embodiment. The beacon frame 1100 is similar to the beacon frame 1000 of FIG. 22, and like-numbered elements are not discussed in detail.

The beacon frame 1100 includes a mandatory portion 1102, which includes a frame control field 1104. Additionally, the access network options field 916 has been moved to the mandatory portion 1102.

The roaming consortium 920 field, when present, and the advertising protocol ID field 1024, when present, have been moved to the IE payload 728. Additionally, an optional interworking element field 1112 is included in the IE payload 728, in an embodiment.

Control frames such as acknowledgments (ACKs), block acknowledgments (BAs), request-to-send (RTS), clear-to-send (CTS), power save polls (PS-Polls), etc., are frequently utilized and thus consume a significant amount of transmission time that may otherwise be available for transmission of user information. Thus, control frames are a source of protocol overhead. Several example techniques, according to various embodiments, for reducing the duration of control frames are disclosed below.

Much of the information carried in prior art SIG fields and/or PHY headers, and some of the information in prior art MAC headers is not needed for control frames. In embodiments described below, portions of the SIG field and/or PHY header are reused and/or reinterpreted to carry MAC header and/or MAC payload information.

In some embodiments control frames are transmitted using a predefined and/or fixed PHY parameters (e.g., using binary phase shift keying (BPSK) and/or a single spatial stream).

Figure 24:
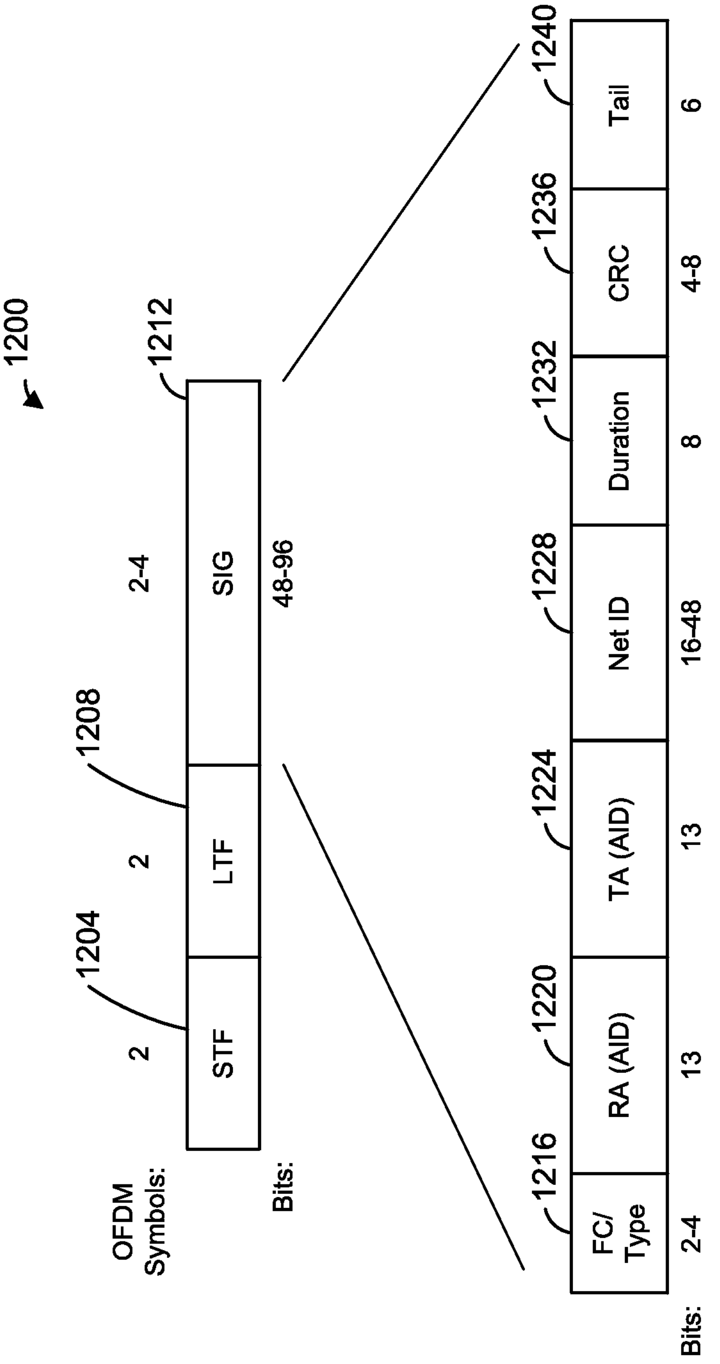
FIG. 24 is a diagram of an example control frame that omits a PHY payload, according to an embodiment.

FIG. 24 is a diagram of an example control frame 1200 that omits a PHY payload portion. In an embodiment, a network interface unit (such as the network interface 16 and/or the network interface 27) is configured to generate and transmit the control frame 1200 (or cause the control frame 1200 to be transmitted).

The control frame 1200 includes a preamble having one or more short training fields (STFs) 1204, one or more long training fields (LTFs) 1208. The control frame 1200 also includes a PHY header having a SIG field 1212. In an embodiment, each STF field 1204 corresponds to 2 OFDM symbols. In an embodiment, each LTF field 1208 corresponds to two OFDM symbols. In various embodiments and/or scenarios, the SIG field 1212 corresponds to two, or three, for four OFDM symbols, and has a length in a range of 48 to 96 bits.

In an embodiment, the preamble is configured to indicate that the frame 1200 is a control frame. For example, a modulation of the preamble is rotated as compared to other types of frames to indicate that the frame 1200 is a control frame, in an embodiment. As another example, a spreading sequence for code is different as compared to other types of frames to indicate that the frame 1200 is a control frame, in an embodiment.

In an embodiment, the SIG field 1212 includes a frame control (FC)/type subfield 1216, a receiver address (RA) subfield 1220, a transmitter address (TA) subfield 1224, a network ID subfield 1228, a duration subfield 1232, a CRC subfield 1236, and a tail and/or padding subfield 1240. Example lengths of the various subfields are shown in FIG. 24. In some embodiments and/or scenarios, one or more of the TA subfield 1224, the network ID subfield 1228, the duration subfield 1232, and/or the tail/padding subfield 1240 are omitted. In an embodiment the RA subfield 1220 includes an AID. In an embodiment the TA subfield 1220 includes an AID. In an embodiment, the network ID subfield 1228 includes a shortened version of a BSSID. For example, in an embodiment, the shortened version of the BSSID is unique in a neighborhood of the BSS. In some embodiments, the RA and/or TA subfields are shortened and/or compressed as compared to RA/TA MAC header fields specified by the current IEEE 802.11 Standard.

Figure 25:
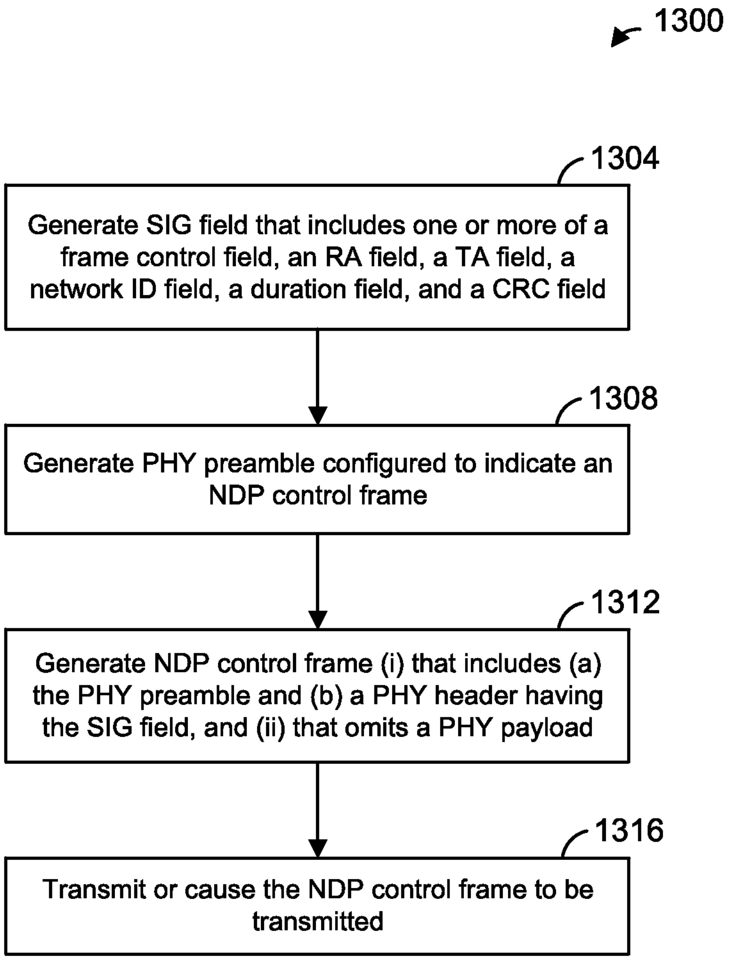
FIG. 25 is a flow diagram of an example method for generating a control frame that omits a PHY payload, according to an embodiment.

FIG. 25 is a flow diagram of an example method 1300 for generating a control frame for wireless transmission, wherein the control frame omits a PHY payload portion, according to an embodiment. In an embodiment, the method 1300 is implemented by a network interface unit (such as the network interface 16 and/or the network interface 27). For example, a network interface is configured to implement the method 1300. In some embodiments, the method 1300 is for generating a control frame discussed above with respect to FIG. 24, or another suitable control frame that omits a PHY payload portion.

At block 1304, a SIG field is generated, wherein the SIG field includes any combination of one or more of a frame control field, an RA field, a TA field, a network ID field, a duration field, and a CRC field. The SIG field is generated as discussed above with respect to FIG. 24, in some embodiments.

At block 1308, a PHY preamble is generated. In an embodiment, the preamble is configured to indicate that the frame is a control frame. For example, a modulation of the preamble is rotated as compared to other types of frames to indicate that the frame is a control frame, in an embodiment. As another example, a spreading sequence for code is different as compared to other types of frames to indicate that the frame is a control frame, in an embodiment.

At block 1312, a control frame that omits a PHY payload portion (an NDP frame) is generated to include (i) the PHY preamble generated at block 1308 and (ii) a PHY header having the SIG field generated at block 1304.

At block 1316, the PHY data unit is transmitted or caused to be transmitted.

Figure 26:
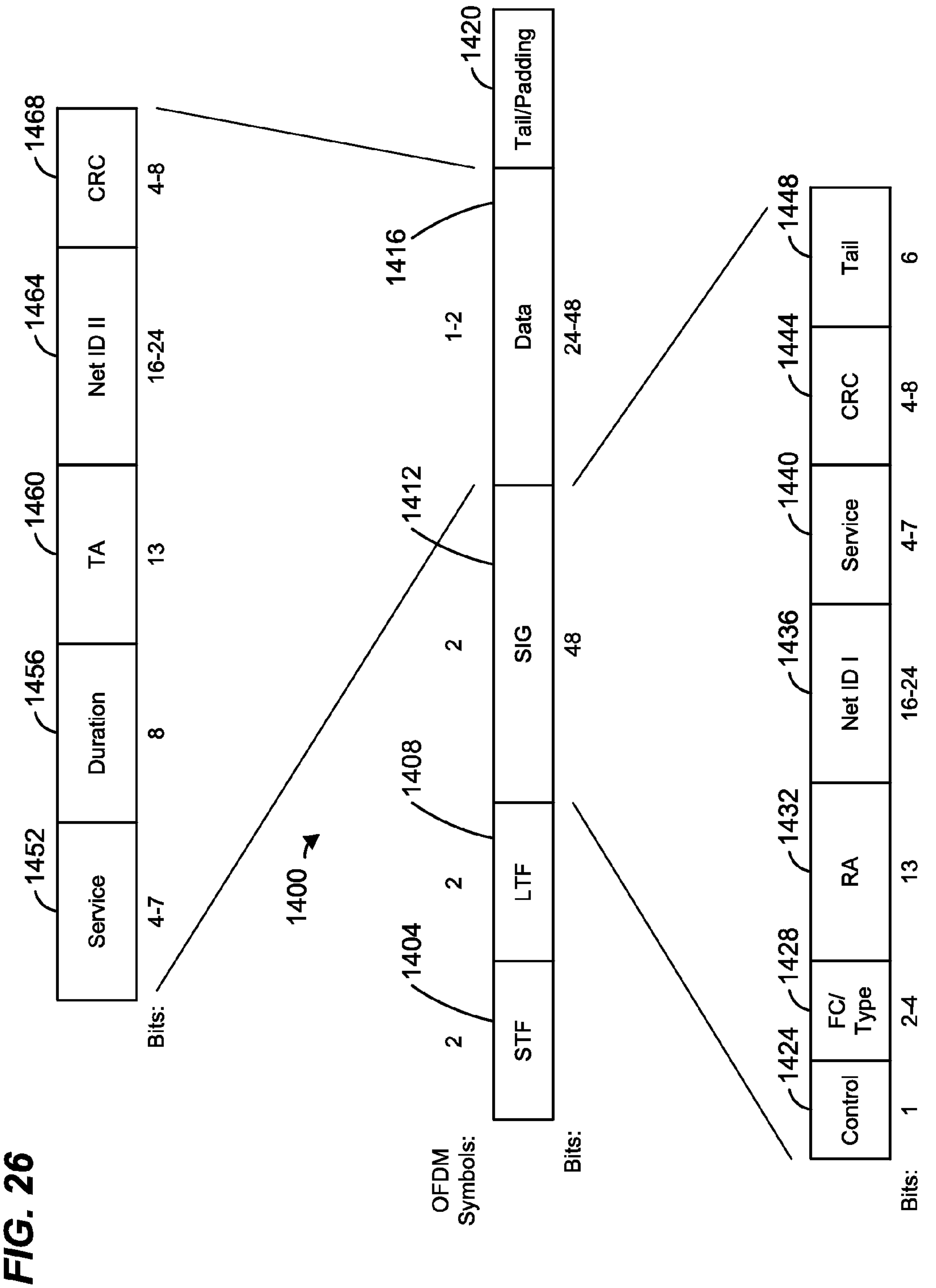
FIG. 26 is a diagram of an example shortened control frame, according to an embodiment.

FIG. 26 is a diagram of an example shorted control frame 1400, according to an embodiment. In an embodiment, a network interface unit (such as the network interface 16 and/or the network interface 27) is configured to generate and transmit the control frame 1400 (or cause the control frame 1400 to be transmitted).

The control frame 1400 includes a preamble having one or more short training fields (STFs) 1404, one or more long training fields (LTFs) 1408. The control frame 1200 also includes a PHY header having a SIG field 1412. In an embodiment, each STF field 1404 corresponds to 2 OFDM symbols. In an embodiment, each LTF field 1408 corresponds to two OFDM symbols. In an embodiment, the SIG field 1412 corresponds to two OFDM symbols, and has a length of 48 bits. In other embodiments, each STF field 1404, each LTF field 1408, and the SIG field 1412 have other suitable lengths.

The control frame 1400 also includes a PHY data payload portion 1416. In an embodiment, the control frame 1400 also includes a tail/padding portion 1420. In some embodiments and/or scenarios, the tail/padding portion 1420 is omitted.

In an embodiment, the SIG field 1212 includes a subfield 1424 to indicate whether the frame 1400 is a control frame. Additionally, the SIG field 1212 includes a frame control (FC)/type subfield 1216, a receiver address (RA) subfield 1220, a first network ID subfield 1436, a service subfield 1440, a CRC subfield 1444, and a tail and/or padding subfield 1448. Example lengths of the various subfields are shown in FIG. 24, although other suitable lengths are utilized in other embodiments. In some embodiments and/or scenarios, one or more of the first network ID subfield 1436, the service field 1440, and/or the tail/padding subfield 1448 are omitted.

In an embodiment the RA subfield 1220 includes an AID. In an embodiment, the first network ID subfield 1436 includes at least a first portion of a BSSID. In another embodiment, the first network ID subfield 1436 includes at least a first portion of a shortened version of a BSSID. For example, in an embodiment, the shortened version of the BSSID is unique in a neighborhood of the BSS.

The data payload portion 1416 includes a service subfield 1452, a duration subfield 1456, a transmitter address (TA) subfield 1460, a second network ID subfield 1464, and a CRC subfield 1468. In some embodiments and/or scenarios, one or more of the service field 1452, the TA subfield 1460, and/or the second network ID subfield 1464 are omitted. For example, when the service field 1440 is included in the SIG field 1412, the service field 1452 is omitted. Similarly, when the service field 1452 is included, the service field 1440 is omitted from the SIG field 1412.

In an embodiment, the TA subfield 1460 includes an AID.

In some embodiments, the RA and/or TA subfields are shortened and/or compressed as compared to RA/TA MAC header fields specified by the current IEEE 802.11 Standard.

Figure 27:
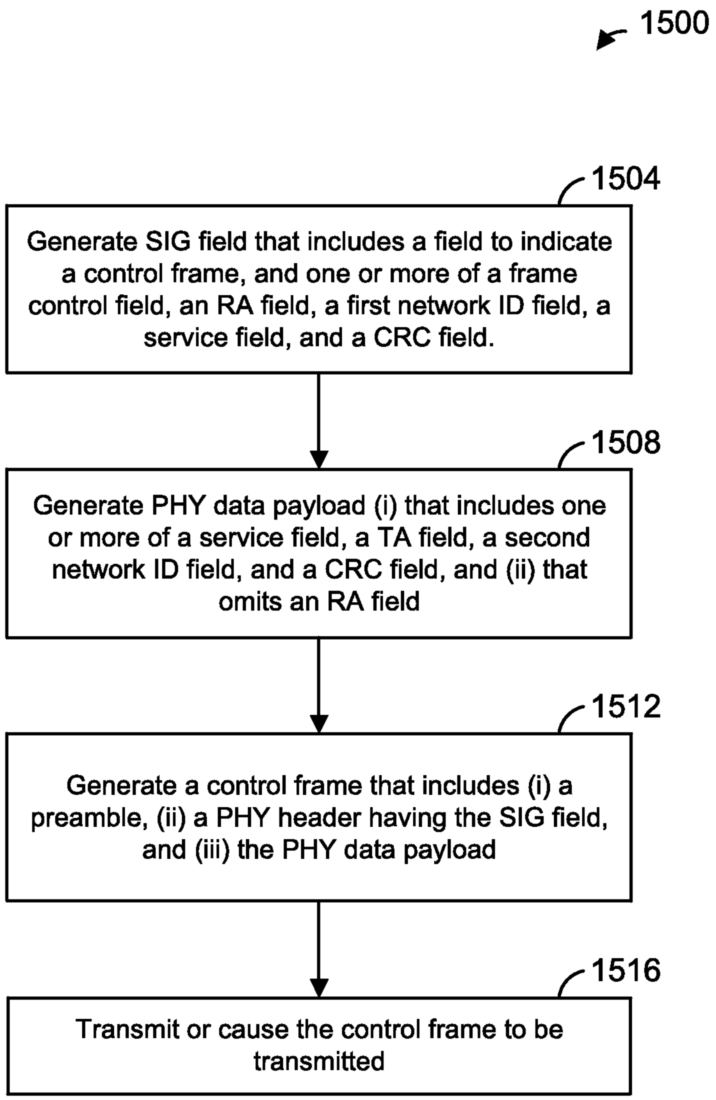
FIG. 27 is a flow diagram of an example method for generating a shortened control frame, according to an embodiment.

FIG. 27 is a flow diagram of an example method 1500 for generating a shortened control frame for wireless transmission, according to an embodiment. In an embodiment, the method 1500 is implemented by a network interface unit (such as the network interface 16 and/or the network interface 27). For example, a network interface is configured to implement the method 1500. In some embodiments, the method 1500 is for generating a control frame discussed above with respect to FIG. 26, or another suitable shortened control frame.

At block 1504, a SIG field is generated, wherein the SIG field includes a subfield to indicate that the frame is a control frame. Additionally, the SIG field is generated to include any combination of one or more of a frame control field, an RA field, a first network ID field, a service field, and a CRC field. The SIG field is generated as discussed above with respect to FIG. 26, in some embodiments.

At block 1508, a PHY payload portion is generated, wherein the PHY payload portion is generated to include any combination of one or more of a service subfield, a duration subfield, a TA subfield, a second network ID subfield, and a CRC field. The PHY payload portion is generated as discussed above with respect to FIG. 26, in some embodiments. In an embodiment, the PHY payload portion is generated to omit at least an RA field.

At block 1512, a control frame is generated to include (i) a PHY preamble, (ii) a PHY header having the SIG field generated at block 1504, and (iii) the PHY payload portion generated at block 1508.

At block 1516, the control frame is transmitted or caused to be transmitted.

At least some of the various blocks, operations, and techniques described above may be implemented utilizing hardware, a processor executing firmware instructions, a processor executing software instructions, or any combination thereof. Also, some of the various blocks, operations, and techniques may be performed in a different order (and/or concurrently) and still achieve desirable results. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:

dynamically determining, at a network interface, a fragmentation threshold based on a current transmission rate;

receiving a medium access control (MAC) service data unit (MSDU);

determining, at the network interface, that a length of the MSDU exceeds the fragmentation threshold;

fragmenting, at the network interface, the MSDU into at least a first MAC protocol data unit (MPDU), a second MPDU, and a third MPDU;

aggregating, at the network interface, at least the first MPDU and the second MPDU into a first aggregate MPDU (A-MPDU);

generating, at the network interface, a first physical layer protocol data unit (PPDU) that includes the first A-MPDU, the first PPDU for transmission via a communication channel;

including, at the network interface, at least the third MPDU in a second A-MPDU; and generating, at the network interface, a second PPDU that includes the second A-MPDU, the second PPDU for transmission via the communication channel.

2. The method of claim 1, wherein dynamically determining the fragmentation threshold comprises determining the fragmentation threshold based at least on a current modulation coding scheme (MCS) being utilized for transmission.

3. The method of claim 1, wherein dynamically determining the fragmentation threshold comprises determining the fragmentation threshold based at least on a current number of spatial streams being utilized for transmission.

4. An apparatus comprising:

a network interface having one or more integrated circuits configured to dynamically determine a fragmentation threshold based on a current transmission rate, determine that a length of a medium access control (MAC) service data unit (MSDU) exceeds the fragmentation threshold, fragment the MSDU into at least a first MAC protocol data unit (MPDU), a second MPDU, and a third MPDU, aggregate at least the first MPDU and the second MPDU into a first aggregate MPDU (A-MPDU);

generate a first physical layer protocol data unit (PPDU) that includes the first A-MPDU, the first PPDU for transmission via a communication channel;

include at least the third MPDU in a second A-MPDU, and generate a second PPDU that includes the second A-MPDU, the second PPDU for transmission via the communication channel.

5. The apparatus of claim 4, wherein the one or more integrated circuits are configured to determine the fragmentation threshold based at least on a current modulation coding scheme (MCS) being utilized by the network interface for transmission.

6. The apparatus of claim 4, wherein the one or more integrated circuits are configured to dynamically determine the fragmentation threshold based at least on a current number of spatial streams being utilized by the network interface for transmission.

7. A method, comprising:

receiving a medium access control (MAC) service data unit (MSDU);

determining, at a network interface, that a length of the MSDU exceeds a fragmentation threshold, wherein the fragmentation threshold is based on a current transmission rate;

fragmenting, at the network interface, the MSDU into at least a first MAC protocol data unit (MPDU), a second MPDU, and a third MPDU;

aggregating, at the network interface, at least the first MPDU and the second MPDU into a first aggregate MPDU (A-MPDU);

generating, at the network interface, a first physical layer protocol data unit (PPDU) that includes the first A-MPDU, the first PPDU for transmission via a communication channel;

including, at the network interface, at least the third MPDU in a second A-MPDU; and generating, at the network interface, a second PPDU that includes the second A-MPDU, the second PPDU for transmission via the communication channel.

8. The method of claim 7, wherein the first A-MPDU includes one or more MPDUs corresponding to another MSDU.

9. The method of claim 7, further comprising:

dynamically determining, at the network interface, the fragmentation threshold based on i) the current transmission rate and ii) the width, in frequency, of the communication channel via which the packet is to be transmitted.

10. An apparatus comprising:

a network interface having one or more integrated circuits configured to determine that a length of a medium access control (MAC) service data unit (MSDU) exceeds a fragmentation threshold, wherein the fragmentation threshold is based on a current transmission rate, fragment the MSDU into multiple MAC protocol data unit (MPDU), a second MPDU, and a third MPDU, aggregate at least the first MPDU and the second MPDU into a first aggregate MPDU (A-MPDU);

generate a first physical layer protocol data unit (PPDU) that includes the first A-MPDU, the first PPDU for transmission via a communication channel, include at least the third MPDU in a second A-MPDU, and generate a second PPDU that includes the second A-MPDU, the second PPDU for transmission via the communication channel.

11. The apparatus of claim 10, wherein the first A-MPDU includes one or more MPDUs corresponding to another MSDU.

12. The apparatus of claim 10, wherein the one or more integrated circuits are configured to:

dynamically determine the fragmentation threshold based on i) the current transmission rate and ii) the width, in frequency, of the communication channel via which the packet is to be transmitted.

* * * * *